US012652557B2

(12) United States Patent
Song et al.

(10) Patent No.: US 12,652,557 B2
(45) Date of Patent: Jun. 9, 2026

(54) APPARATUS AND METHOD FOR E2 NODE CONTROL IN WIRELESS COMMUNICATION SYSTEM

(71) Applicant: Samsung Electronics Co., Ltd., Suwon-si (KR)

(72) Inventors: Junhyuk Song, Suwon-si (KR); Sunheui Ryoo, Suwon-si (KR); Jeongyeob Oak, Suwon-si (KR); Chungkeun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 508 days.

(21) Appl. No.: 18/189,768

(22) Filed: Mar. 24, 2023

(65) Prior Publication Data

US 2023/0239710 A1    Jul. 27, 2023

Related U.S. Application Data

(63) Continuation of application No. PCT/KR2022/004458, filed on Mar. 29, 2022.

(30) Foreign Application Priority Data

Mar. 29, 2021    (KR) ........................ 10-2021-0040762
Apr. 7, 2021    (KR) ........................ 10-2021-0045524

(51) Int. Cl.
*H04W 24/04*    (2009.01)
*H04W 88/12*    (2009.01)
*H04W 92/24*    (2009.01)
(52) U.S. Cl.
CPC ............ *H04W 24/04* (2013.01); *H04W 88/12* (2013.01); *H04W 92/24* (2013.01)

(58) Field of Classification Search
CPC ..... H04W 24/04; H04W 88/12; H04W 92/24; H04W 76/10; H04W 24/02; H04W 92/12
See application file for complete search history.

(56) References Cited

U.S. PATENT DOCUMENTS

2020/0329381 A1    10/2020   Chou et al.
2023/0171592 A1*    6/2023   Han ........................ H04W 8/20
                                                           370/328

FOREIGN PATENT DOCUMENTS

CN    111565418 A    8/2020
CN    111642011 A    9/2020
            (Continued)

OTHER PUBLICATIONS

Radisys, ONF SD-RAN: Open Source RIC, xApps & Integration with DU/CU, Aug. 31, 2020.
            (Continued)

*Primary Examiner* — Christopher M Brandt
(74) *Attorney, Agent, or Firm* — Jefferson IP Law, LLP

(57)    ABSTRACT

A method performed by performed by a near-real time (RT) radio access network (RAN) intelligent controller (RIC) is provided. The method includes transmitting, to a E2 node, an RIC control request message including information on a control action identity (ID), and receiving, from the E2 node, an RIC control acknowledge message or an RIC control failure message in response to the RIC control request message, wherein the RIC control acknowledge message or the RIC control failure message includes information on an RIC control outcome, wherein the information on the RIC control outcome includes at least one set of RAN parameter, wherein each of the at least one set of RAN parameter includes a RAN parameter ID and a RAN parameter value.

20 Claims, 27 Drawing Sheets

(56) References Cited

FOREIGN PATENT DOCUMENTS

| EP | 1 134 951 A2 | 9/2001 |
| KR | 10-2021-0007841 A | 1/2021 |
| WO | 2021/048831 A1 | 3/2021 |

OTHER PUBLICATIONS

Nokia, 5G RAN optimization using the O-RAN software community's RIC (RAN Intelligent Controller), ONS Europe, Sep. 23, 2019.

O-RAN Working Group 3 Near-Real-time RAN Intelligent Controller E2 Application Protocol (E2AP), ORAN-WG3.E2AP-v01.00.00, Jan. 28, 2020.

O-RAN Working Group 3 Near-Real-time RAN Intelligent Controller E2 Service Model (E2SM), RAN Function Network Interface (NI), ORAN-WG3.E2SM-NI-v01.00.00, Jan. 29, 2020.

3rd Generation Partnership Project; Technical Specification Group Radio Access Network; NG-RAN; E1 Application Protocol (E1AP) (Release 16), 3GPP TS 38.463 V16.4.0, Jan. 4, 2021.

O-RAN Working Group 3 Near-Real-time RAN Intelligent Controller Architecture & E2 General Aspects and Principles, O-RAN.WG3.E2GAP-v01.01, Jul. 15, 2020.

International Search Report dated Jul. 6, 2022, issued in International Application No. PCT/KR2022/004458.

O-RAN Working Group 3 Near-Real-time RAN Intelligent Controller E2 Service Model (E2SM), RAN Function Network Interface (NI), ORAN-WG3.E2SM-NI-v01.00.00, Jan. 31, 2020.

O-RAN Working Group 3, Near-Real-time RAN Intelligent Controller, E2 Application Protocol (E2AP), O-RAN.WG3.E2AP-v01.01, Jul. 15, 2020.

European Search Report dated Jun. 12, 2024, issued in European Application No. 22781586.7.

* cited by examiner

CONTROL PLANE

Radio
Network
Layer

Transport
Network
Layer

Near-RT RIC

E2 Node

E2 SETUP REQUEST (1301)
(RAN Function Definition)

E2 SETUP REPONSE (1303)

| IE/Group Name | Presence | Range | IE type and reference |
|---|---|---|---|
| RAN Function Name | M | | 8.3.2 |
| Sequence of EVENT TRIGGER styles | | 0..<br><maxnoofRICStyles> | |
| >RIC Event Trigger Style Type | M | | 8.3.3 |
| >RIC Event Trigger Style Name | M | | 8.3.4 |
| >RIC Event Trigger Format Type | M | | 8.3.5 |
| Sequence of CONTROL styles | | 0..<br><maxnoofRICStyles> | |
| >RIC Control Style Type | M | | 8.3.3 |
| >RIC Control Style Name | M | | 8.3.4 |
| >Sequence of Allowed Control Actions | | 0..<br><maxnoofControlAction> | |
| >>Allowed Control Action ID | M | | 8.3.6 |
| >>Allowed Control Action Name | M | | 8.3.7 |
| >>Sequence of Associated RAN Parameters | | 0..<br><maxnoofAssociated<br>RANInfo> | |
| >>>RAN Parameters ID | M | | 8.3.8 |
| >>>RAN Parameters Name | M | | 8.3.9 |
| >Sequence of Allowed RAN Resources | | 0..<br><maxnoofControlRAN<br>Resources> | |
| >>RAN Parameters ID | M | | 8.3.8 |
| >>RAN Parameters Name | M | | 8.3.9 |
| >RIC control Header Format Type | M | | 8.3.5 |
| >RIC control Message Format Type | M | | 8.3.5 |
| >RIC control Process Format Type | M | | 8.3.5 |
| >RIC control Outcome Format Type | M | | 8.3.5 |

FIG.13A

| IE/Group Name | Presence | Range | IE type and reference | Semantics description | Criticality | Assigned Criticality |
|---|---|---|---|---|---|---|
| Message Type | M | | 9.2.3 | | YES | reject |
| RIC Request ID | M | | 9.2.7 | | YES | reject |
| RAN Function ID | M | | 9.2.8 | | YES | reject |
| RIC Call Process ID | O | | 9.2.18 | | YES | reject |
| RIC Control Header | M | | 9.2.20 | | YES | reject |
| RIC Control Message | M | | 9.2.19 | | YES | reject |
| RIC Control Ack Request | O | | 9.2.21 | | YES | reject |

FIG.14A

| IE/Group Name | Presence | Range | IE type and reference | Semantics description | Criticality | Assigned Criticality |
|---|---|---|---|---|---|---|
| Message Type | M | | 9.2.3 | | YES | reject |
| RIC Request ID | M | | 9.2.7 | | YES | reject |
| RAN Function ID | M | | 9.2.8 | | YES | reject |
| RIC Call Process ID | O | | 9.2.18 | | YES | reject |
| RIC Control Status | M | | 9.2.22 | | YES | reject |
| RIC Control Outcome | O | | 9.2.25 | | YES | reject |

FIG.14B

| IE/Group Name | Prese nce | Range | IE type and reference | Semantics description |
|---|---|---|---|---|
| CHOICE Format | | | | |
| >E2SM-RC Control Outcome Format 1 | M | | | ' |
| >E2SM-RC Control Outcome Format 2 | M | | | |

FIG.15

| IE/Group Name | Presence | Range | IE type and reference | Semantics description |
|---|---|---|---|---|
| Sequence of Control Outcomes | | 0.. *<maxnoofControlOutcome>* | | |
| >UE ID | O | | | |
| >Sequence of Associated Information | | 0.. <maxnoofControlAckRANResources | | |
| >>RAN Parameter ID | M | | | |
| >>RAN Parameter Container | M | | | |
| | | | | |

FIG.16A

| IE/Group Name | Presence | Range | IE type and reference | Semantics description |
|---|---|---|---|---|
| RAN Parameter ID | M | | INTEGER (1..<br>4294967296, ···) | |

FIG.16B

| RAN Parameter ID | RAN Parameter Name | RAN Parameter Definition | Parameter description |
|---|---|---|---|
| 1 | QoS Flow Failed to Setup List | QoS Flow ID in TS 38.423 | |
| 2 | QoS Flow Failed to Modify List | QoS Flow Failed to Modify List IE in TS 38.423 | |
| 3 | DRB Failed to Setup List | DRB Failed to Setup List IE in TS 38.473 | Failed to handover DRB list in target cell |
| 4 | DRB Failed to be Modified List | DRB Failed to be Modified List IE in TS 38.473 | |
| 5 | F1AP Cause | 9.3.1.2 Cause in TS 38.473 | |
| 6 | E1AP Cause | 9.3.1.2 Cause in TS 38.463 | |
| 7 | XnAP Cause | 9.2.3.2 Cause in TS 38.423 | |
| 8 | NGAP Cause | 9.3.1.2 Cause in TS 38.413 | In case Path Switch Failure happens··· |
| 9 | X2AP Cause | 9.2.6 Cause in TS 36.423 | |
| 10 | W1AP Cause | 9.3.1.2 Cause in TS 37.473 | |
| 11 | S1AP Cause | 9.2.1.3 Cause in TS 36.413 | |
| 12 | Interface Name | | F1/E1/Xn/X2/W1/··· |
| | | | |

FIG.16C

| RIC Style Type | Style Name |
|:---:|:---|
| 1 | Radio Bearer Control |
| 2 | Radio Resource Allocation |
| 3 | Connected Mode Mobility |
| 4 | Radio Access Control |
| 5 | Dual Connectivity |
| 6 | Carrier Aggregation |
| 7 | Idle mode mobility control |
| 8 | UE context record modification |

FIG.18

| IE/Group Name | Presence | Range | IE type and reference | Semantics description |
|---|---|---|---|---|
| RIC Style Type | M | | | |
| Sequence of Control Outcomes | | 0..<br>*<maxnoofContr olOutcome>* | | |
| >UE ID | O | | | |
| > Sequence of Successful outcome of RAN CONTROL | | 0..<br>*<maxnoofContr olAckRANReso urces1>* | | |
| >>RAN Parameter ID | M | | | |
| >>RAN Parameter Container | M | | | |
| > Sequence of Failed Outcome of RAN CONTROL | | 0..<br>*<maxnoofContr olAckRANReso urces2>* | | |
| >>RAN Parameter ID | M | | | |
| >>RAN Parameter Container | M | | | |
| | | | | |

FIG.19

APPARATUS AND METHOD FOR E2 NODE CONTROL IN WIRELESS COMMUNICATION SYSTEM

CROSS-REFERENCE TO RELATED APPLICATION(S)

This application is a continuation application, claiming priority under § 365(c), of an International application No. PCT/KR2022/004458, filed on Mar. 29, 2022, which is based on and claims the benefit of a Korean patent application number 10-2021-0040762, filed on Mar. 29, 2021, in the Korean Intellectual Property Office, and of a Korean patent application number 10-2021-0045524, filed on Apr. 7, 2021, in the Korean Intellectual Property Office, the disclosure of each of which is incorporated by reference herein in its entirety.

TECHNICAL FIELD

The disclosure relates to an apparatus and a method for E2 node control by a radio access network (RAN) intelligent controller (RIC) in an RAN. More particularly, the disclosure relates to an apparatus and a method for controlling an E2 node through an E2 message conforming to an open RAN (O-RAN) of a wireless communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

To meet the demand for wireless data traffic, the 5G system, new radio or next radio (NR), has been commercialized, providing users with a high data rate service through the 5G system like 4G, and also for the Internet of Things and specific purposes. It is expected that wireless communication services having various purposes, such as services requiring high reliability, can be provided. open radio access network (O-RAN), established by gathering and established by operators and equipment providers in a system mixed with the current 4th generation communication system and 5th generation system, is a new network element (NE) and interface standard based on the existing 3GPP standard. is defined, and the O-RAN structure is presented.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide an apparatus and a method for generating and transferring a message, with error details occurring if a radio access network (RAN) intelligent controller (RIC) controls an E2 node in a wireless communication system.

Another aspect of the disclosure is to provide an apparatus and a method for configuring an E2 node by an RIC for the E2 node to transfer error details under control of the RIC.

Additional aspects will be set forth in part in the description which follows and, in part, will be apparent from the description, or may be learned by practice of the presented embodiments.

Technical Solution

In accordance with an aspect of the disclosure, a method performed by a radio access network (RAN) intelligent controller (RIC) is provided. The method includes receiving, from a E2 node, a setup request message including RAN function information specific to service model, the RAN function information includes information on one or more control actions, transmitting, to the E2 node, a setup response message, transmitting, to the E2 node, an RIC control request message, and receiving, from the E2 node, an RIC control acknowledge message. The RIC control request message includes identification information of a control action among the one or more control actions, the RIC control acknowledge message includes RIC control outcome information for the control action, and the RIC control outcome information includes a reason of an event for the control action in a specific protocol.

In accordance with another aspect of the disclosure, a method performed by a E2 node is provided. The method includes transmitting, to a radio access network (RAN) intelligent controller (RIC), a setup request message including RAN function information specific to service model, the RAN function information includes information on one or more control actions, receiving, from the RIC, a setup response message, receiving, from the RIC, an RIC control request message, and transmitting, to the RIC, an RIC control acknowledge message. The RIC control request message includes identification information of a control action among the one or more control actions, the RIC control acknowledge message includes RIC control outcome information for the control action, and the RIC control outcome information includes a reason of an event for the control action in a specific protocol.

In accordance with another aspect of the disclosure, an apparatus of a radio access network (RAN) intelligent controller (RIC) is provided. The apparatus includes at least one transceiver, and at least one processor. The at least one processor is configured to control the at least one transceiver to receive, from a E2 node, a setup request message including RAN function information specific to service model, the RAN function information includes information on one or more control actions, transmit, to the E2 node, a setup response message, transmit, to the E2 node, an RIC control request message, and receive, from the E2 node, an RIC control acknowledge message. The RIC control request message includes identification information of a control action among the one or more control actions, the RIC control acknowledge message includes RIC control outcome information for the control action, and the RIC control outcome information includes a reason of an event for the control action in a specific protocol.

In accordance with another aspect of the disclosure, an apparatus of a E2 node is provided. The apparatus includes at least one transceiver, and at least one processor. The at least one processor is configured to control the at least one transceiver to transmit, to a radio access network (RAN) intelligent controller (RIC), a setup request message including RAN function information specific to service model, the RAN function information includes information on one or more control actions, receive, from the RIC, a setup response message, receive, from the RIC, an RIC control request message, and transmit, to the RIC, an RIC control acknowledge message. The RIC control request message includes identification information of a control action among the one or more control actions, the RIC control acknowledge message includes RIC control outcome information for the control action, and the RIC control outcome information includes a reason of an event for the control action in a specific protocol.

In accordance with another aspect of the disclosure, a method performed by a near-RT (real time) RIC (radio access network (RAN) intelligent controller (RIC)), the method comprising: transmitting, to a E2 node, an RIC control request message including information on a control action identity (ID), and receiving, from the E2 node, an RIC control acknowledge message or an RIC control failure message in response to the RIC control request message, wherein the RIC control acknowledge message or the RIC control failure message includes information on an RIC control outcome, wherein the information on the RIC control outcome includes at least one set of RAN parameter, wherein each of the at least one set of RAN parameter includes a RAN parameter ID and a RAN parameter value.

In accordance with another aspect of the disclosure, a method performed by a E2 node, the method comprising: receiving, from a near-RT (real time) RIC (radio access network (RAN) intelligent controller (RIC)), an RIC control request message including information on a control action identity (ID), and transmitting, to the near-RT RIC, an RIC control acknowledge message or an RIC control failure message in response to the RIC control request message, wherein the RIC control acknowledge message or the RIC control failure message includes information on an RIC control outcome, wherein the information on the RIC control outcome includes at least one set of RAN parameter, wherein each of the at least one set of RAN parameter includes a RAN parameter ID and a RAN parameter value.

In accordance with another aspect of the disclosure, an apparatus of a near-RT (real time) RIC (radio access network (RAN) intelligent controller (RIC)), comprising: at least one transceiver; and at least one processor coupled to the at least one transceiver, wherein the at least one processor is configured to: transmit, to a E2 node, an RIC control request message including information on a control action identity (ID), and receive, from the E2 node, an RIC control acknowledge message or an RIC control failure message in response to the RIC control request message, wherein the RIC control acknowledge message or the RIC control failure message includes information on an RIC control outcome, wherein the information on the RIC control outcome includes at least one set of RAN parameter, wherein each of the at least one set of RAN parameter includes a RAN parameter ID and a RAN parameter value.

In accordance with another aspect of the disclosure, an apparatus of a E2 node, comprising: at least one transceiver; and at least one processor coupled to the at least one transceiver, wherein the at least one processor is configured to: receive, from a near-RT (real time) RIC (radio access network (RAN) intelligent controller (RIC)), an RIC control request message including information on a control action identity (ID), and transmit, to the near-RT RIC, an RIC control acknowledge message or an RIC control failure message in response to the RIC control request message, wherein the RIC control acknowledge message or the RIC control failure message includes information on an RIC control outcome, wherein the information on the RIC control outcome includes at least one set of RAN parameter, wherein each of the at least one set of RAN parameter includes a RAN parameter ID and a RAN parameter value.

Advantageous Effects

An apparatus and a method according to embodiments of the disclosure enable an E2 node to notify a reason according to event occurrence (e.g., failure) to a radio access network (RAN) intelligent controller (RIC).

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 13A illustrates signaling of a setup procedure between an E2 node and an RIC according to an embodiment of the disclosure;

FIG. 14A illustrates an example of an RIC control request message format according to an embodiment of the disclosure;

FIG. 14B illustrates an example of an RIC control acknowledge message format according to an embodiment of the disclosure;

FIG. 15 illustrates an example of an E2 service model RAN control (E2SM-RC) control outcome information element (IE) in an RIC control acknowledge message according to an embodiment of the disclosure;

FIGS. 16A, 16B, and 16C illustrate examples of an RIC control acknowledge message for transferring a cause IE according to embodiments of the disclosure;

FIG. 18 illustrates an example of a type of RIC style according to an embodiment of the disclosure; and FIG. 19 illustrates an example of an RIC control acknowledge message for transferring a cause IE according to an embodiment of the disclosure.

Throughout the drawings, it should be noted that like reference numbers are used to depict the same or similar elements, features, and structures.

MODE FOR INVENTION

Figure 1:
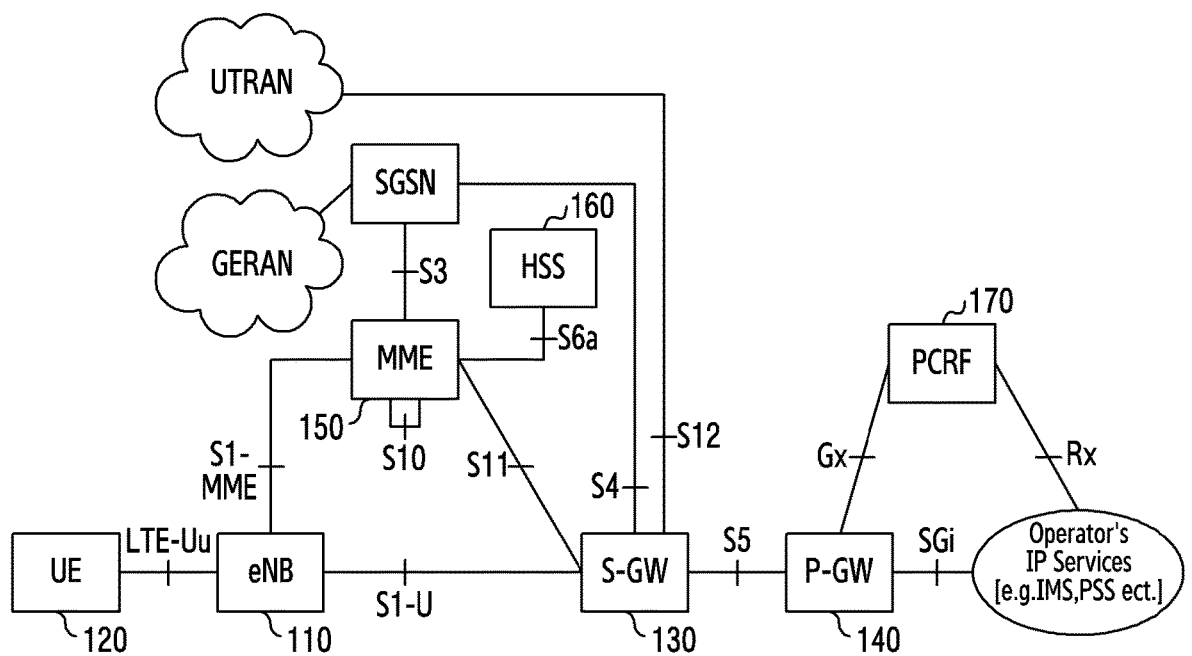
FIG. 1 illustrates an example of a 4th generation (4G) long term evolution (LTE) core system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms used in the disclosure are used merely to describe specific embodiments, and may not intend to limit the scope of other embodiments. Singular expressions may include plural expressions unless the context clearly indicates otherwise. Terms used herein, including technical or scientific terms, may have the same meaning as those commonly understood by a person of ordinary skill in the technical field described in the disclosure. Among the terms used in the disclosure, terms defined in a general dictionary may be interpreted as having the same or similar meanings as those in the context of the related art, and unless explicitly defined in the disclosure, may not be interpreted as ideal or excessively formal meanings. In some cases, even terms defined in the disclosure may not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereafter, the present disclosure relates to control procedure between a device in a radio access network (RAN) and a device for controlling the RAN in a wireless communication system. Specifically, the present disclosure relates to a procedure, message, and method for transmitting a RIC control request message from an RIC to an E2 node on an E2 interface in a radio access network, identifying whether the RIC control request by the E2 node was correctly made or failed, and if it fails, determining the reason of it.

Terms for signals, terms indicating channels, terms indicating control information, terms indicating network entities, and terms indicating components of a device used in the following explanation are illustrated for convenience of description. Accordingly, the disclosure is not limited to the terms to be described, and other terms having the same technical meaning may be used.

Also, in the disclosure, to determine whether a specific condition is satisfied or fulfilled, expressions such as greater than or less than are used but are merely an expression by way of example and do not exclude expressions of equal to or greater than or equal to or less than. A condition expressed as 'greater than or equal to' may be replaced by 'greater than', a condition expressed as 'less than or equal to' may be replaced by 'less than', and a condition expressed as 'greater than or equal to and less than' may be replaced by 'greater than and less than or equal to'.

In addition, the disclosure describes various embodiments using terms used in some communication standard (e.g., 3rd generation partnership project (3GPP), open radio access network (O-RAN)), but this is only an example for description. Various embodiments of the disclosure may be easily modified and applied in other communication systems.

As the 4th generation (4G)/5th generation (5G) communication system (e.g., new radio (NR)) has been commercialized, supporting differentiated services to users has been required in a virtualized network. The 3GPP is a joint research project of mobile communication-related groups and works for the purpose of writing the 3rd generation (3G) mobile communication system standard, which is globally applicable, within the scope of the IMT-2000 project of the international telecommunications union (ITU). The 3GPP was established in December 1998, and the 3GPP standard is based on an enhanced GSM standard and includes radio and core networks and a service architecture in the range of standardization. Accordingly, the open radio access network (O-RAN) may newly define a radio unit (RU), a digital unit (DU), a central unit-control plane (CU-CP), and a CU-user plane (CU-UP), which are nodes configured as a base station and a 3GPP network entity (3GPP NE), as an O(O-RAN)-RU, an O-DU, an O-CU-CP, and an O-CU-UP, respectively, and may additionally standardize a near-real-time (NRT) radio access network intelligent controller (RIC). The disclosure is to support an operator specific service model in an E2 interface in which an RIC requests a service from an O-DU, an O-CU-CP, or an O-CU-UP. Here, the O-RU, O-DU, O-CU-CP, O-CU-UP may be understood as objects operable according to the O-RAN standard, included in an RAN, and referred to as E2 nodes. Interfaces between an RIC and E2 nodes that are objects operable according to the O-RAN standard and included in the RAN may use an application protocol (E2AP).

The RIC may be a logical node that may collect information associated with a cell site in which a UE and an O-DU, O-CU-CP, or O-CU-UP perform transmission or reception. The RIC may be embodied in the form of servers intensively disposed in a single physical place. Connection between the O-DU and the RIC, between the O-CU-CP and the RIC, and between O-CU-UP and the RIC may be established via Ethernet. To this end, there is a desire for the standard of an interface for communication between the O-DU and the RIC, between the O-CU-CP and the RIC, and between the O-CU-UP and the RIC. A message standard such as E2-DU, E2-CU-CP, E2-CU-CP, and the like and procedures between the RIC and each of the O-DU, the O-CU-CP, O-CU-UP may need to be defined. Specifically, supporting differentiated services to users may be required in a virtualized network, and functions of messages of the E2-DU, E2-CU-CP, and E2-CU-UP for supporting a service with respect to a broad cell coverage area by concentrating, in the RIC, a message/function of processing a call produced in the O-RAN may need to be defined.

The RIC may perform communication with the O-CU, O-CU-CP, and O-CU-UP using an E2 interface, and may configure a condition for producing an event by producing and transmitting a subscription message. Specifically, the RIC may produce and transfer an E2 subscription request (subscription Request) message to an E2 node (e.g., the O-CU-CP, O-CU-UP, and O-DU), so as to configure a call processing event. After configuring the event, the E2 node may transfer a subscription request response message to the RIC.

The E2 node may transmit a current state to the RIC via an E2 indication/report. The RIC may control the O-DU, O-CU-CP, and O-CU-UP by using an E2 control message. Various embodiments of the disclosure may suggest an E2 indication message including measurement information for each UE, and transmitted from an O-DU at intervals configured in a condition for a subscription event. In addition, various embodiments of the disclosure may suggest a resource control message transmitted from the RIC to the O-DU.

FIG. 1 illustrates an example of a 4th generation (4G) long term evolution (LTE) core system according to an embodiment of the disclosure.

Referring to FIG. 1, the LTE core system includes a base station 110, a terminal 120, a serving gateway (S-GW) 130, a packet data network gateway (P-GW) 140, a mobility management entity (MME). 150, a home subscriber server (HSS) 160, and a policy and charging rule function (PCRF) 170.

The base station 110 is a network infrastructure for providing radio access to the terminal 120. For example, the base station 110 is a device which performs scheduling by collecting status information such as a buffer status, an available transmission power, and a channel status of the terminal 120. The base station 110 has coverage defined as a specific geographic region based on a signal transmission distance. The base station 110 is connected to the MME 150 through an S1-MME interface. Besides the base station, the base station 110 may be referred to as an 'access point (AP)', an 'eNodeB (eNB)', a 'wireless point', and a 'transmission/reception point (TRP)' or other term having the equivalent technical meaning.

The terminal 120 is a device used by the user, and performs communication with the base station 110 over a radio channel. In some cases, the terminal 120 may be operated without user's involvement. That is, at least one of the terminal 120 and the S-GW 130 is a device which performs machine type communication (MTC), and may not be carried by the user. Besides the terminal, the terminal 120 may be referred to as a 'UE', a 'mobile station', a 'subscriber station', a 'customer-premises equipment (CPE)', a 'remote terminal', a 'wireless terminal', or a 'user device', or other term having the equivalent technical meaning.

The S-GW 130 provides a data bearer, and generates or controls the data bearer under control of the MME 150. For example, the S-GW 130 processes a packet arriving from the base station 110 or a packet to be forwarded to the base station 110. In addition, the S-GW 130 may perform an anchoring role in handover of the terminal 120 between base stations. The P-GW 140 may function as a connection point to an external network (e.g., an internet network). In addition, the P-GW 140 allocates an internet protocol (IP) address to the terminal 120, and serves as an anchor for the S-GW 130. In addition, the P-GW 140 may apply quality of service (QoS) policy of the terminal 120, and manage accounting data.

The MME 150 manages mobility of the terminal 120. In addition, the MME 150 may perform authentication, bearer management, and the like on the terminal 120. That is, the MME 150 is responsible for mobility management and various control functions of the terminal. The MME 150 may interwork with a serving general packet radio service (GPRS) support node (SGSN).

The HSS 160 stores key information and a subscriber profile for the authentication of the terminal 120. The key information and the subscriber profile are transmitted from the HSS 160 to the MME 150 if the terminal 120 accesses the network.

The PCRF 170 defines a policy and a charging rule. The stored information is transmitted from the PCRF 180 to the P-GW 140, and the P-GW 140 may control the terminal 120 (e.g., QoS management, charging, etc.) based on the information provided from the PCRF 180.

Carrier aggregation (hereafter, 'CA') technology is a technology which combines a plurality of component carriers, and transmits and receives at one terminal a signal using the plurality of the component carriers at the same time and thus increases frequency use efficiency in terms of the terminal or the base station. Specifically, according to the CA technology, the terminal and the base station may transmit and receive signals using a broadband using the plurality of the component carriers in the uplink (UL) and the downlink (DL), wherein the component carriers are located in different frequency bands respectively. Hereafter, the UL indicates a communication link through which the terminal transmits a signal to the base station, and the DL indicates a communication link through which the base station transmits a signal to the terminal. At this time, the numbers of uplink component carriers and downlink component carriers may be different.

Dual connectivity or multi connectivity is a technology for increasing the frequency use efficiency in terms of the terminal or the base station, in which one terminal is connected to a plurality of different base stations and transmits and receives signals simultaneously using carriers within the plurality of the base stations positioned in different frequency bands. The terminal may be connected to a first base station (e.g., a base station which provides services using the LTE technology or the 4G mobile communication technology) and a second base station (e.g., a base station which provides services using the NR technology or 5G mobile communication technology) at the same time to transmit and receive traffic. In this case, frequency resources used by each base station may be positioned in different bands. As such, the operation scheme based on the dual connectivity scheme of the LTE and the NR may be referred to as 5G non-standalone (NSA).

Figure 2A:
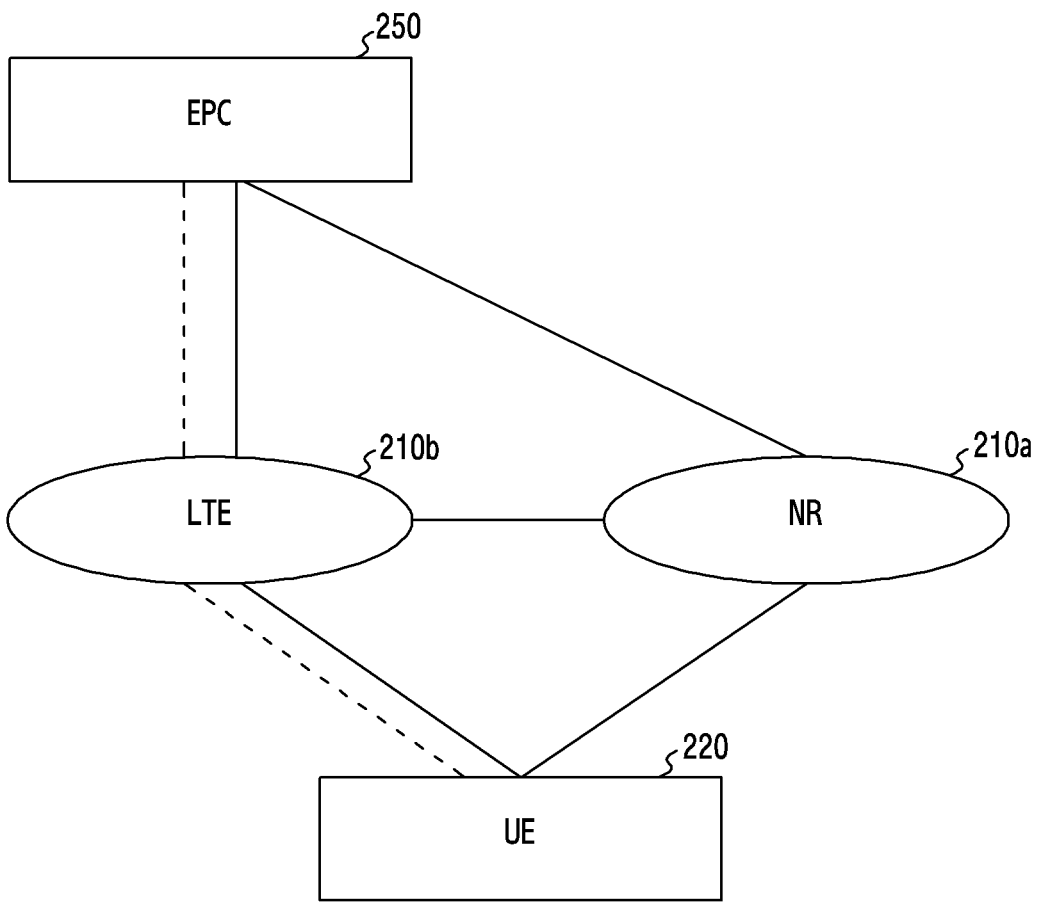
FIG. 2A illustrates an example of a 5th generation (5G) non-standalone (NSA) system according to an embodiment of the disclosure.

FIG. 2A illustrates an example of a 5G NSA system according to an embodiment of the disclosure.

Referring to FIG. 2A, the 5G NSA system includes an NR RAN 210a, an LTE RAN 210b, a terminal 220, and an evolved packet core network (EPC) 250. The NR RAN 210a and the LTE RAN 210b are connected to the EPC 250, and the terminal 220 may be served by any one or both of the NR RAN 210a and the LTE RAN 210b at the same time. The NR RAN 210a includes at least one NR base station, and the LTE RAN 210b includes at least one LTE base station. Herein, the NR base station may be referred to as a '5G node', a 'next generation nodeB (gNB)' or other term having the equivalent technical meaning. In addition, the NR base station may have a structure divided into a CU and a DU, and the CU may also have a structure divided into a CU-CP unit and a CU-UP unit.

In the structure shown in FIG. 2A, the terminal 220 may perform radio resource control (RRC) access through the first base station (e.g., a base station belonging to the LTE RAN 210b), and may be served with functions (e.g., connection management, mobility management, etc.) provided in the control plane. In addition, the terminal 220 may receive additional radio resources for transmitting and receiving data via a second base station (e.g., a base station belonging to the NR RAN 210a). This dual connectivity technology using the LTE and the NR may be referred to as evolved universal terrestrial radio access (E-UTRA)-NR (EN)-dual connectivity (DC). Similarly, the dual connectivity technology in which the first base station uses the NR technology and the second base station uses the LTE technology is referred to as NR-E-UTRA (NE)-DC. In addition, various embodiments may be applied to the multi connectivity and the CA technology of various types. In addition, various embodiments may be applicable even if a first system using a first communication technology and a second system using a second communication technology are implemented in one device or if the first base station and the second base station are located at the same geographic location.

Figure 2B:
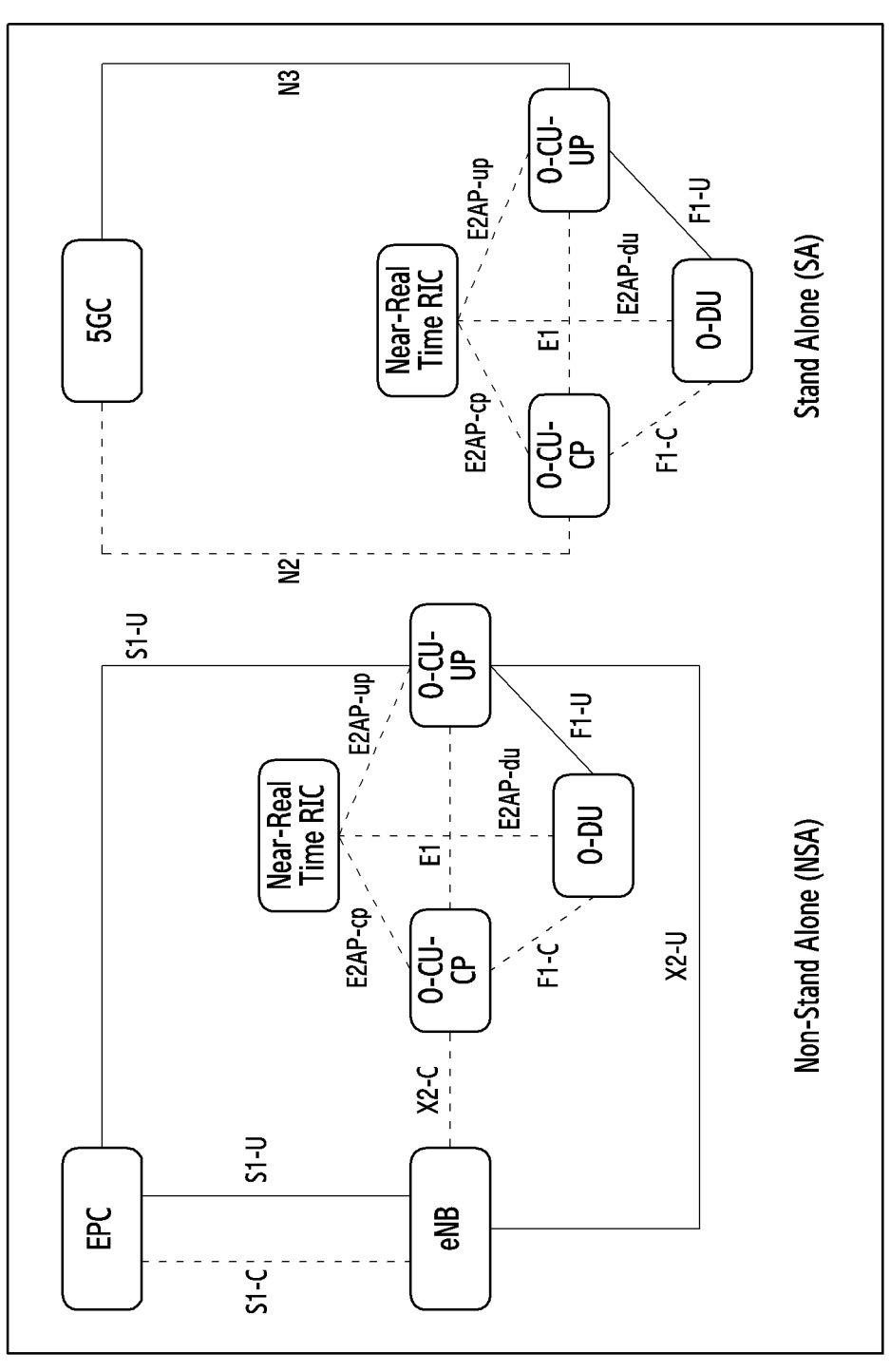
FIG. 2B illustrates an example of architecture for open-radio access network (O-RAN) according to an embodiment of the disclosure.

FIG. 2B shows an architecture example for the O-RAN. For the sake of E2 service model (SM) key performance indicators (KPI) (E2-SM-KPI) monitoring (KPIMON) of an E2 service model, an O-RAN non-stand alone in the multi-connectivity operation using the E-UTRA and the NR radio access technology is considered, whereas the E2 node may be assumed to be in an O-RAN standalone mode according to an embodiment of the disclosure.

Referring to FIG. 2B, in deployment of the O-RAN non-standalone mode, the eNB is connected with the EPC through an S1-C/S1-U interface, and is connected with the O-CU-CP through an X2 interface. The O-CU-CP for the deployment of the O-RAN standalone mode may be connected with a 5G core (5GC) through an N2/N3 interface.

Figure 3:
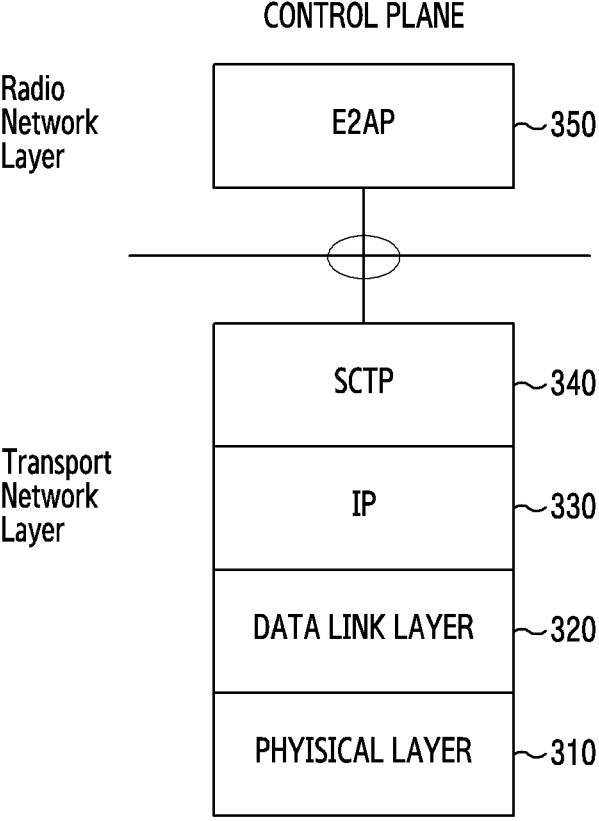
FIG. 3 illustrates a protocol stack of an E2 application protocol message in a radio access network according to an embodiment of the disclosure.

FIG. 3 illustrates a protocol stack of an E2 application protocol message in a radio access network according to an embodiment of the disclosure. Referring to FIG. 3, a control plane includes a transport network layer and a radio network layer. The transport network layer includes a physical layer 310, a data link layer 320, an internet protocol (IP) layer 330, and a stream control transmission protocol (SCTP) layer 340.

The radio network layer includes an E2 application protocol (E2AP) 350. The E2AP 350 is used to deliver a subscription message, an indication message, a control message, a service update message, and a service query message, and is transmitted in a higher layer of the SCTP 340 and the IP 330.

Figure 4:
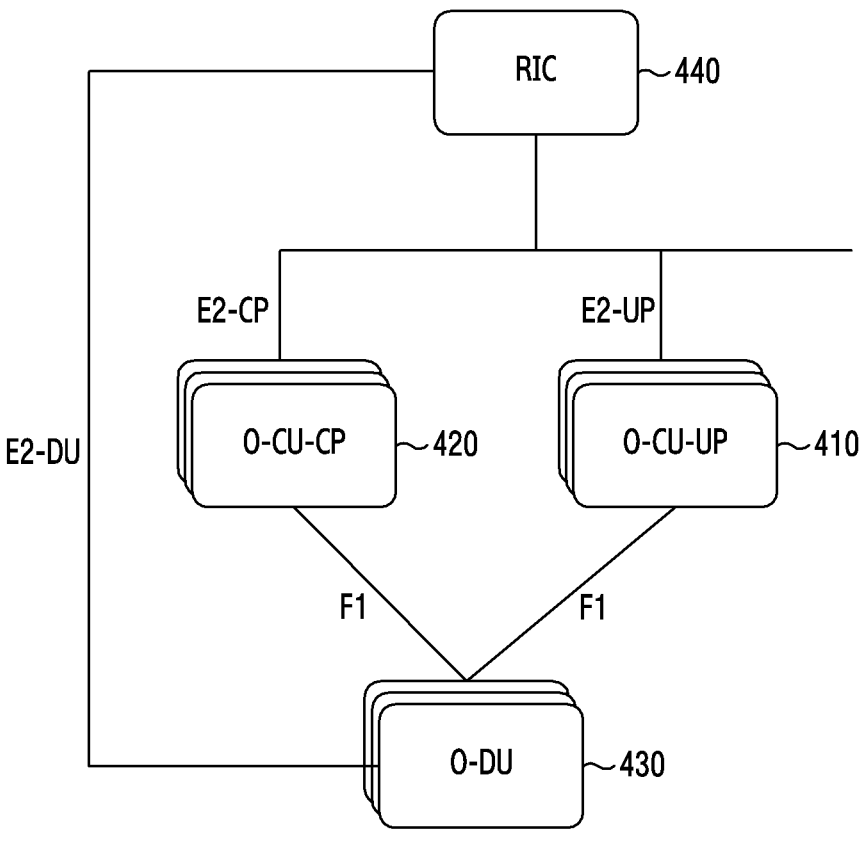
FIG. 4 illustrates an example of a connection between a base station and a radio access network (RAN) intelligence controller (RIC) in a radio access network according to an embodiment of the disclosure.

FIG. 4 illustrates an example of a connection between a base station and an RIC in a radio access network according to an embodiment of the disclosure.

Referring to FIG. 4, an RIC 440 is connected to an O-CU-CP 420, an O-CU-UP 410, and an O-DU 430. The RIC 440 is a device for customizing RAN functionality for a new service or regional resource optimization. The RIC 440 may provide functions such as network intelligence (e.g., policy enforcement, handover optimization), resource assurance (e.g., radio-link management, advanced self-organized-network (SON)), resource control (e.g., load balancing, slicing policy). The RIC 440 may communicate with the O-CU-CP 420, the O-CU-UP 410, and the O-DU 430. The RIC 440 may be connected to each node through E2-CP, E2-UP, and E2-DU interfaces. In addition, the interface between the O-CU-CP and the DU and between the O-CU-UP and the DU may be referred to as an F1 interface. In the following description, the DU and the O-DU, the CU-CP and the O-CU-CP, and the CU-UP and the O-CU-UP may be used interchangeably.

While FIG. 4 illustrates one RIC 440, a plurality of RICs may exist, according to various embodiments. The plurality of the RICs may be implemented with a plurality of hardware located at the same physical location or may be implemented through virtualization using single hardware.

Figure 5:
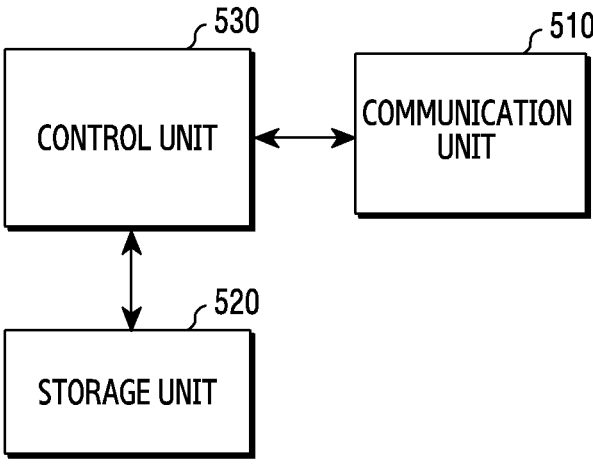
FIG. 5 illustrates a configuration of a device in a radio access network according to an embodiment of the disclosure.

FIG. 5 illustrates a configuration of a device according to an embodiment of the disclosure. The structure illustrated in FIG. 5 may be understood as a configuration of a device having at least one function of the RIC, the O-CU-CP, the O-CU-UP, and the O-DU of FIG. 5. A term such as ' . . . unit' or ' . . . er' used hereafter indicates a unit for processing at least one function or operation, and may be implemented using hardware, software, or a combination of hardware and software.

Referring to FIG. 5, a core network device includes a communication unit 510 (e.g., a transceiver), a storage unit 520 (e.g., a memory), and a control unit 530 (e.g., a processor).

The communication unit 510 provides an interface for performing communication with other devices in the network. That is, the communication unit 510 converts a bit string transmitted from the core network device to other device into a physical signal, and converts a physical signal received from other device into a bit string. That is, the communication unit 510 may transmit and receive signals. Accordingly, the communication unit 510 may be referred to as a modem, a transmitter, a receiver, or a transceiver. In this case, the communication unit 510 enables the core network device to communicate with other devices or systems via a backhaul connection (e.g., wired backhaul or wireless backhaul) or over the network.

The storage unit 520 stores data such as a basic program, an application program, and setting information for the operations of the core network device. The storage unit 520 may include a volatile memory, a nonvolatile memory, or a combination of a volatile memory and a nonvolatile memory. The storage unit 520 provides the stored data according to a request of the control unit 530.

The control unit 530 controls general operations of the core network device. For example, the control unit 530 transmits and receives signals through the communication unit 510. In addition, the control unit 530 records and reads data in and from the storage unit 520. For doing so, the control unit 530 may include at least one processor. According to various embodiments, the control unit 530 may control the device to carry out operations according to various embodiments explained in the disclosure.

Figure 6:
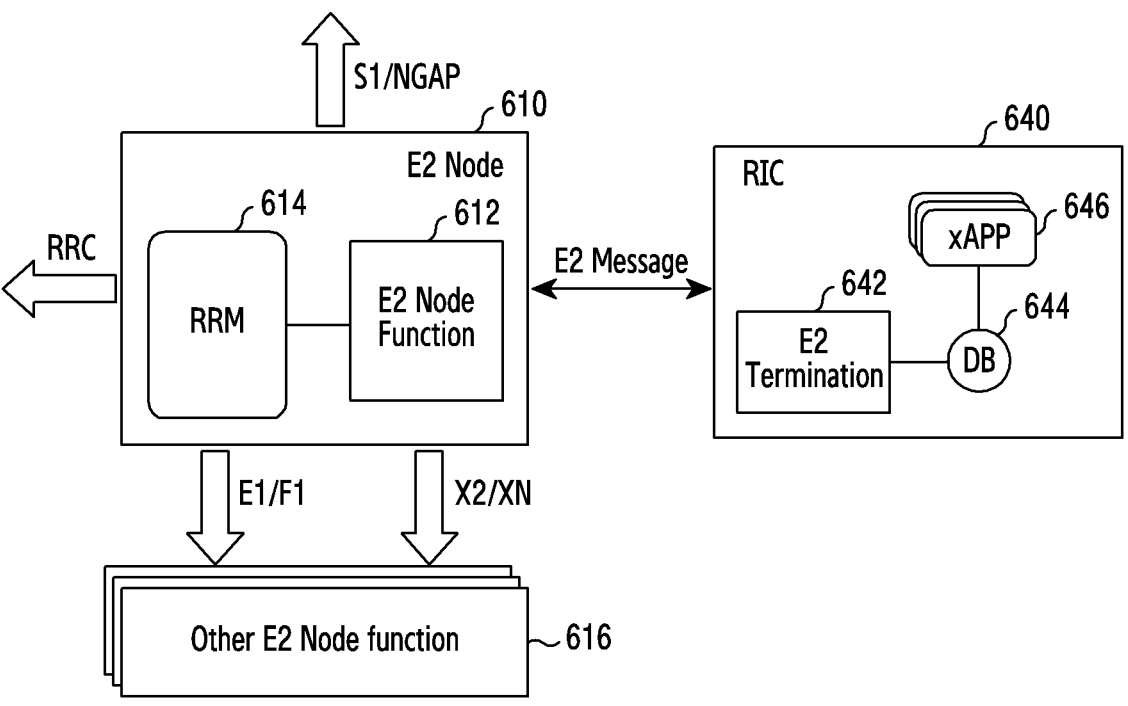
FIG. 6 illustrates logical functions related to E2 messages of an E2 node and an RIC in a radio access network according to an embodiment of the disclosure.

FIG. 6 illustrates logical functions related to E2 messages of an E2 node and an RIC in a radio access network according to an embodiment of the disclosure.

Referring to FIG. 6, an RIC 640 and an E2 node 610 may transmit or receive an E2 message with each other. For example, the E2 node 610 may be an O-CU-CP, an O-CU-UP, an O-DU, or a base station. A communication interface of the E2 node may be determined according to the type of the E2 node 610. For example, the E2 node 610 may communicate with another E2 node 616 through the E1 interface or the F1 interface. Alternatively, for example, the E2 node 610 may communicate with the E2 node 616 through an X2 interface or an XN interface. Alternatively, for example, the E2 node 610 may perform communication through an S1 interface or a next generation application protocol (NGAP) interface (i.e., an interface between a next generation (NG) RAN node and an access and mobility function (AMF)).

The E2 node 610 may include an E2 node function 612. The E2 node function 612 is a function corresponding to a specific xApp (application software (S/W)) 646 installed in the RIC 640. For example, in the KPI monitor, KPI monitor collection S/W may be installed in the RIC 640, and the E2 node 610 may include the E2 node function 612 which generates KPI parameters, and then forwards an E2 message including the KPI parameters to an E2 termination 642 positioned at the RIC 640. The E2 node 610 may include a radio resource management (RRM) 614. The E2 node 610 may manage resources provided to the radio network for the terminal.

The E2 termination 624 positioned in the RIC 640, which is a termination of the RIC 640 for the E2 message, may perform a function of interpreting the E2 message forwarded by the E2 node 610 and then forwarding it to the xApp 646. A database (DB) 644 positioned in the RIC 640 may be used for the E2 termination 624 or the xApp 646. The E2 node 610 shown in FIG. 6 is a termination of at least one interface, and may be understood as a termination of messages transmitted to a terminal, a neighbor base station, and a core network.

Figure 7:
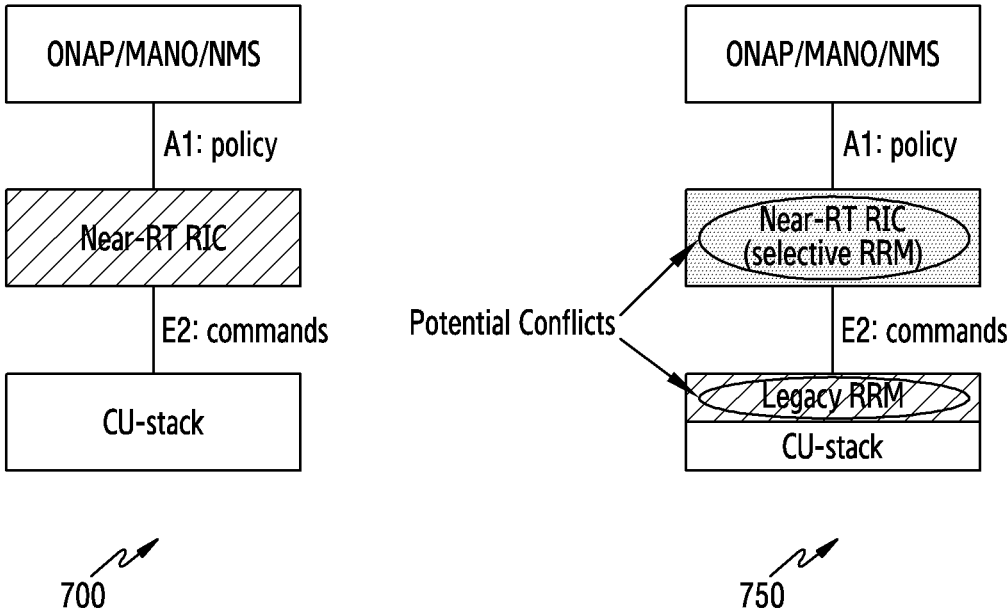
FIG. 7 illustrates function split examples between an E2 node and an RIC according to an embodiment of the disclosure.

FIG. 7 illustrates function split examples between an E2 node and an RIC according to an embodiment of the disclosure. The O-RAN standard provides the function split between the E2 node and the RIC. For example, the E2 node may be the CU. The RIC may be the near RT RIC. The RIC may be connected to an open network automation platform (ONAP)/management and orchestration (MANO)/network management system (NMS) through an A1 interface. The RIC may be connected to the E2 node through an E2 interface. The E2 interface may transfer commands. The function split option may include function split 700 which manages the whole RRM at the near-RT RIC, and function split 750 which selectively manages the RRM at the near-RT RIC.

The near-RT RIC is to support the E2 as an open logical interface for the sake of a multi-vendor environment regardless of specific RRC-RRM algorithm implementation located at the nRT-RIC according to WG3 decision of 2019 Jan. 16 meeting. The disclosure may suggest an E2 service model radio interface control (E2SM-RIC) which pairs with E2SM-NI for injecting/modifying/configuring a per UE RRC message for each I/F and network entity (NE). In other words, the near RT RIC may be gradually improved from the function split 750 toward the function split 700. The E2 may advance to the open logical interface which is independent of specific RRC-RRM algorithm implementation in the nRT-RIC and aims at the multi-vendor environment.

Figure 8:
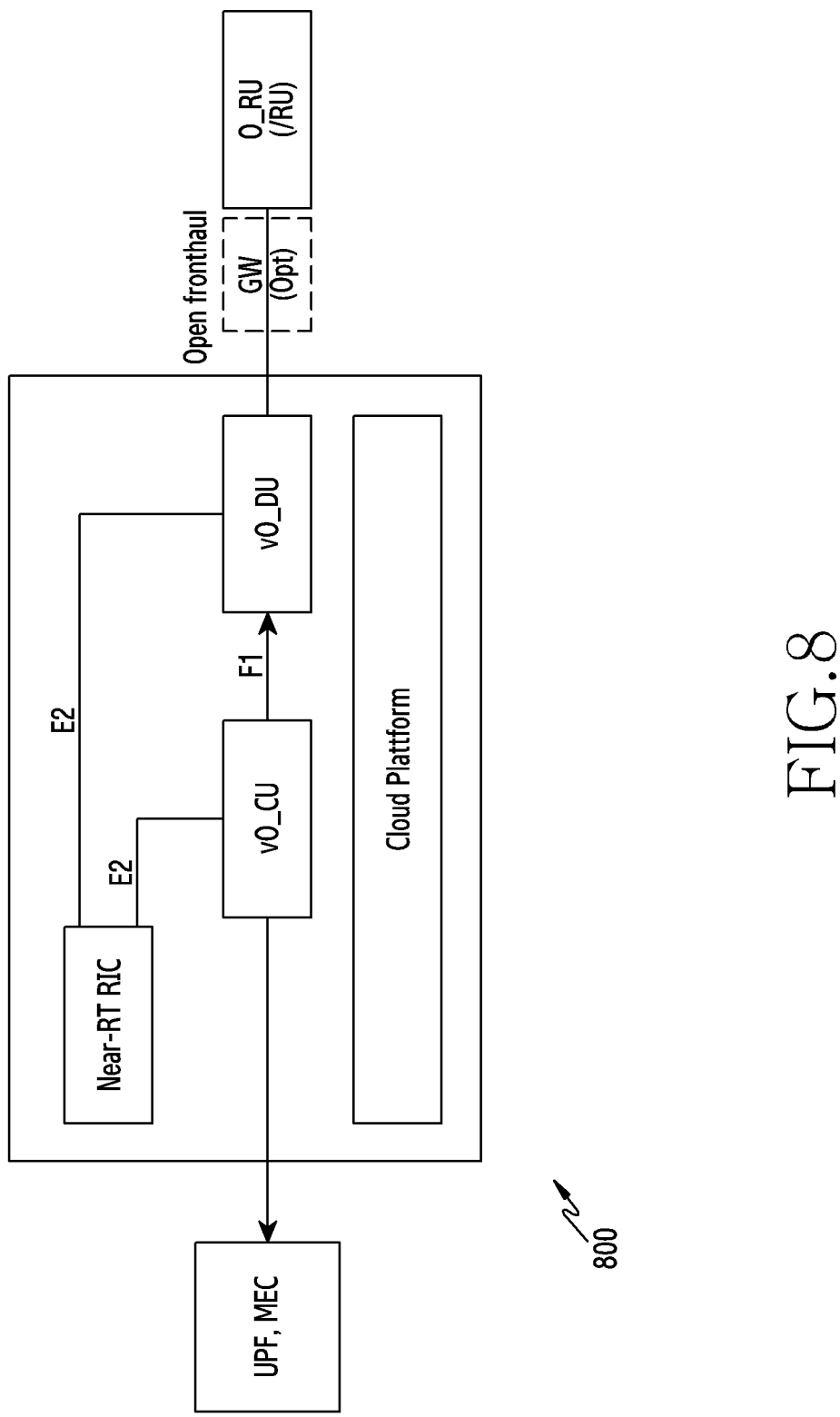
FIG. 8 illustrates an implementation example of an E2 node and an RIC according to an embodiment of the disclosure.

FIG. 8 illustrates an implementation example of an E2 node and an RIC according to an embodiment of the disclosure. In a scenario of an implementation example 800, the E2 node (e.g., an O-DU, an O-CU) and the RIC may be virtualized on a cloud platform (e.g., an open chassis and a blade spec edge cloud), and configured in a device (e.g., a server). This scenario may support distribution in an urban area crowded with abundant fronthaul capacity allowing a base band unit (BBU) function polled at a central location, with low latency enough to satisfy O-DU standby requirements. Hence, it may be unnecessary to attempt to centralize the RIC close to the RT over limits for centralizing the O-DU function. According to an embodiment, the E2SM-RIC may be optimized for the O-RAN distribution scenario which implements the near-RT RIC, the O-CU and the O-DU on the O-cloud platform.

Figure 9:
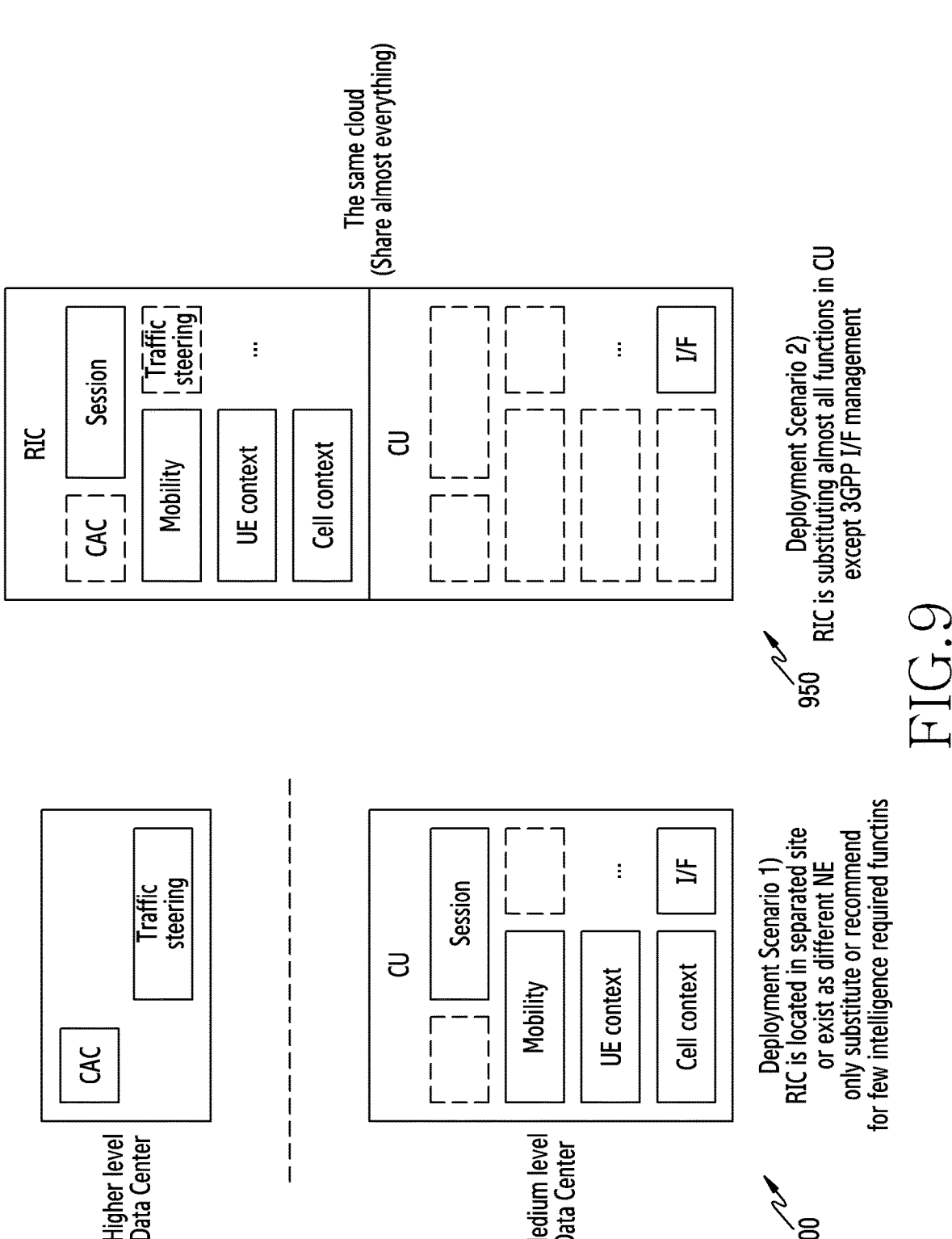
FIG. 9 illustrates function split examples between a centralized unit (CU) and an RIC according to an embodiment of the disclosure.

FIG. 9 illustrates function split examples between a CU and an RIC according to an embodiment of the disclosure. Referring to FIG. 9, the function splits may be performed according to a deployment scenario #1 900 or a function deployment scenario #2 950.

Deployment scenario #1 900: the RIC may be located in a separate site or exist as a different NE, and substitutes or recommends few required intelligence functions.

Deployment scenario #2 950: the RIC may substitute almost every function of the UE except 3GPP I/F management.

While FIG. 9 illustrates two scenarios, other scenarios may be applied. For example, the mobility function may be carried out by the RIC, rather than the CU, in the deployment scenario #1 900. Also, for example, the UE context may be carried out by the RIC, rather than the CU, in the deployment scenario #1 900. Also, for example, the session configuration function may be carried out by the RIC, rather than the CU, in the deployment scenario #1 900.

Figure 10:
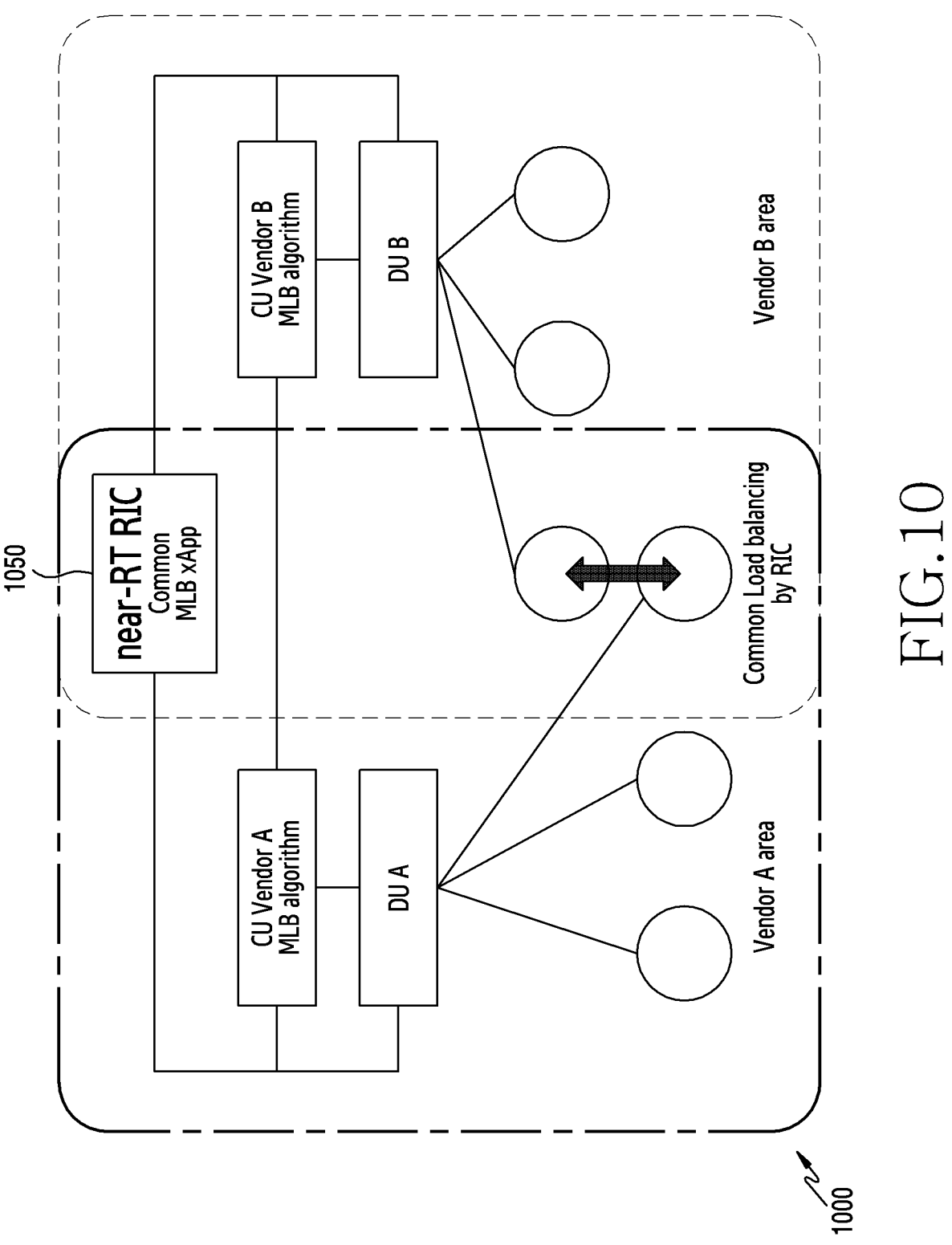
FIG. 10 illustrates an example of mobility load balancing (MLB) control for different vendors according to an embodiment of the disclosure.

FIG. 10 illustrates an example 1000 of mobility load balancing (MLB) control for different vendors according to an embodiment of the disclosure. Such MLB may be conducted under RRM control. A first CU and a first DU may be provided by a vendor A. A second CU and a second DU may be provided by a vendor B. The first DU may provide a service area of the vendor A. RUs connected with the first DU may provide the service area of the vendor A. The second DU may provide a service area of the vendor B. RUs connected with the second DU may provide the service area of the vendor B.

A determination to which cell is optimal when a UE moves may be performed through load balancing. If this load balancing is conducted by different vendors, it may be difficult to smoothly perform the load balancing in a space where the service areas of the vendors overlap. That is, an inter vendor zone or an inter CU-CP area may require interworking of the vendors. For the interworking of the vendors, the RRM control may require centralized execution. Hence, the RIC 1050 according to various embodiments of the disclosure may be configured to perform the RRM. The RIC 1050 may not only receive measurement from each E2 node, but also generate a message for controlling each E2 node. The RIC 1050 may transmit a control message to each E2 node (e.g., the DU or the CU-CP, the CU-UP).

Figure 11A:
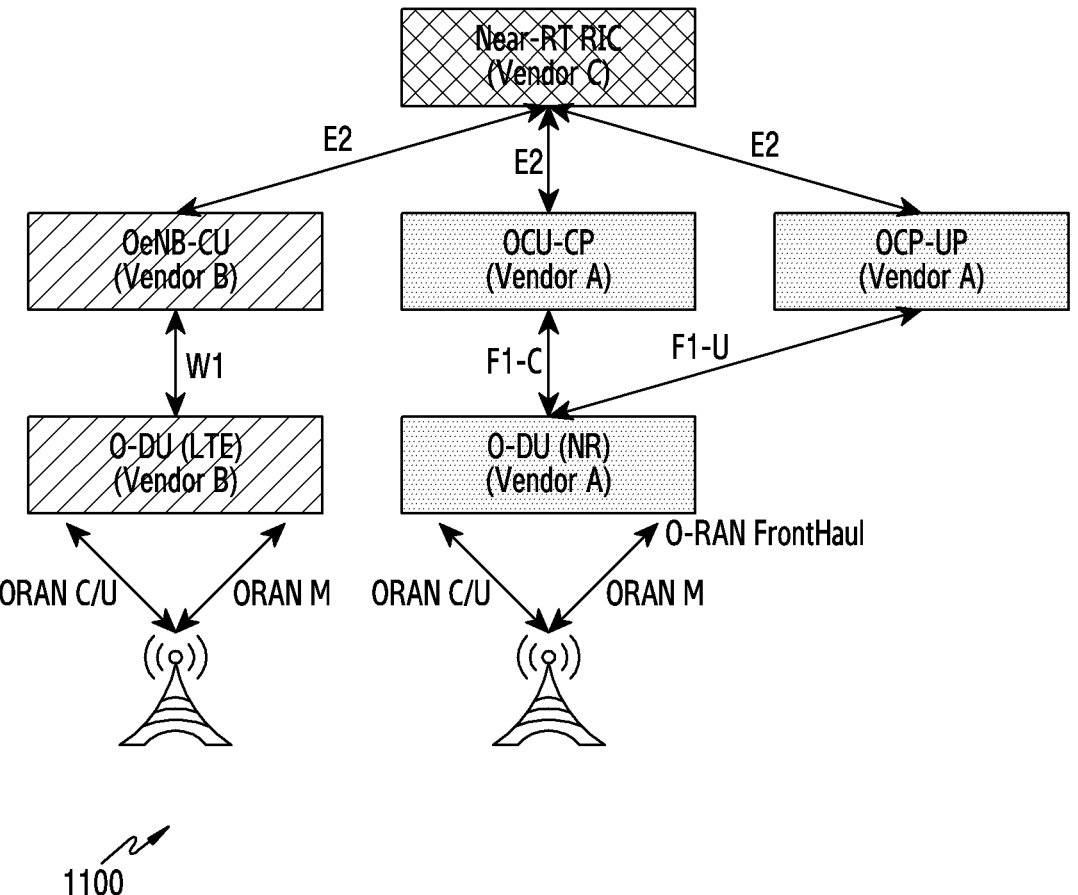
FIG. 11A illustrates an example of MLB control for different vendors according to an embodiment of the disclosure.

FIG. 11A illustrates an example of MLB control for different vendors according to an embodiment of the disclosure. First, unlike FIG. 11A, if a single vendor operates, RAN context may be identified at the near-RT RIC. In addition, trigger event/report, insert, policy conditions may operate. A control action may also operate, and a general subfunction definition approach may also operate. However, as shown in FIG. 11A, if multiple vendors operate, the RAN context may not be identified at the near-RT RIC. In addition, the trigger event/report, insert, policy conditions do not operate. The control action may not operate or may rely on the implementation, due to local RRM conflict.

The single E2SM-RAN control hardly operates in the O-RAN situation of the multi-vendor environment. There is because there are function parity and operation parity, considering all RAN features. The RAN function parity indicates a difference of features related to the RRM functions (e.g., quality of service (QoS) handover, load balancing (LB) handover, etc.). The RAN operation parity indicates a difference of features related to the RAN operations (e.g., an EN-DC SCG bearer change procedure). Besides, the report/insert/control/policy actions may not identify accurate RAN context. In addition, the report/insert/control/policy actions may not identify trigger event/conditions according to the report/insert/policy. In addition, it may be difficult to refer to the RAN context in a specific deployment in a corresponding action.

Referring to FIG. 11A, a wireless communication environment 1100 shows network entities configured through three vendors in total. The vendor A may be an NR provider. The vendor B may be an LTE provider. The vendor C may be an RIC provider. To address the above-stated problems, no matter which vender's E2 node is connected, one entity for managing all of them is required. Since the near-RT RIC may collect measurement information of different vendors, the near-RT RIC may more easily perform the management and the control than other entities. Hence, the near-RT RIC performs the RRM in the centralized manner, and thus difference and compatibility problems between the vendors may be addressed. Besides, the difference and compatibility problems between the vendors may be addressed, even with different RATs.

Hereafter, the centralized RRM by the near-RT RIC may be referred to and described as terms such as RIC-based RRM control or E2 node zombie mode, E2SM-RIC zombie mode, E2SM-RIC dedicated mode in the disclosure. It is noted that the technical meaning that the function of each E2 node is performed by the RIC instead may be used in place of the illustrated terms.

Figure 11B:
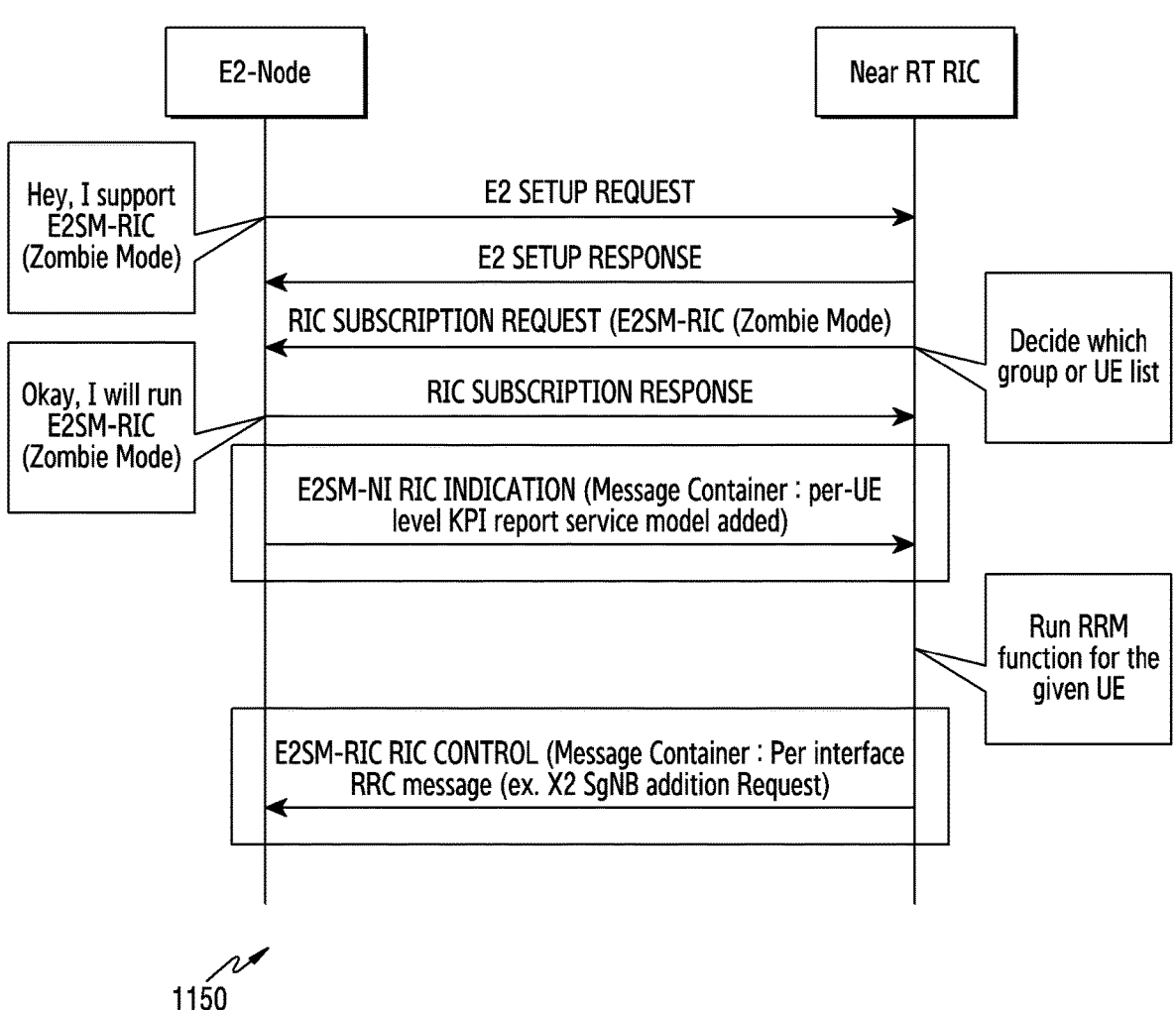
FIG. 11B illustrates signaling for radio resource management (RRM) control configuration of a near-real time (near RT) RIC according to an embodiment of the disclosure.

FIG. 11B illustrates signaling for RRM control configuration of the near-RT RIC according to an embodiment of the disclosure. FIG. 11B illustrates the example 1150 of the signaling procedure between the E2 node and the RIC. Specifically, FIG. 11B illustrates an E2 I/F setup procedure and an RIC subscription message transfer procedure between the E2 node and the RIC. In addition, FIG. 11B illustrates a transfer procedure of an RIC indication message and an RIC control message.

Referring to FIG. 11B, the E2 node may transmit an E2 setup request message to the RIC. E2 node function located in the E2 node may find the RIC using an RIC IP address configured with operation-administration-maintenance (OAM) and transmit the E2 setup request message. In so doing, the E2 node may request the RIC-based RRM control. For example, the E2 node may transmit to the RIC the E2 setup request message including that the E2 node may operate in the zombie mode. Next, the RIC may receive an E2 setup response message from the E2 node. The RIC may determine from the E2 node, whether the E2 node may support the zombie mode, that is, full RRM control by the RIC is possible.

Referring to FIG. 11B, the RIC may transmit an RIC subscription request message to the E2 node. A specific xApp located in the RIC requests subscription from an RIC E2 termination function with respect to a specific RAN function definition function supported by the E2. According to an embodiment, the subscription request message may include information for indicating whether the RIC performs the RIC-based RRM control. For example, the subscription request message may include information for indicating whether the RIC operates as the E2SM-RIC. In addition, for example, the RIC may transmit the subscription request message including a zombie mode indicator. According to an embodiment, the RIC-based RRM control may be performed based on the UE basis or a UE group including the UE. The RIC-based RRM control may be performed on the UE or the group including the UE located in the area between the vendors or a common service area of CU-UPs, as shown in FIG. 10 and FIG. 11A. In so doing, the subscription request message may include an ID indicating the group (hereafter, a group identifier) or an ID for indicating a specific UE (hereafter, a terminal ID/UE ID).

According to an embodiment, as shown in FIG. 7, the transmission of the subscription request message and the E2 setup response message may be separately transmitted. According to another embodiment, the subscription request message of the step may be included in the E2 setup response message of the step and transmitted together.

In a next step, the E2 node may transmit an RIC subscription response to the RIC. The E2 node function of the E2 node may decode the subscription request message. The E2 node may identify whether the RIC is the E2SM RIC.

The E2 node may identify whether the RIC operates in the zombie mode or the E2 node operates in the zombie mode.

Referring to FIG. 11B, the E2 node may transmit an E2 RIC indication message to the RIC. The E2 node and the RIC may perform an RIC indication procedure. According to embodiments of the disclosure, the RIC indication message may include a per-UE KPI report. According to an embodiment, a message container of the RIC indication message may include a per-UE KPI report service model. Next, the RIC may perform the RRM on a corresponding UE. Although not depicted in FIG. 11B, the RIC may perform the RRM, and generate a control message including specific information related to a resource allocation procedure. Hence, the RIC may control each E2 node.

An E2SM RIC control message may be transmitted to the E2 node 610. The E2 node 610 and the RIC 640 may perform the RIC control procedure. The RIC 640 may generate the E2SM-RIC control message, for the control procedure of the E2 node. For example, the E2SM-RIC control message may include a message container. The message container may include a per-interface RRC message (e.g., an X2 secondary gNB (SgNB) addition request message).

FIG. 11B describes based on the UE, but the measurement may be performed and reported on various bases such as UE group/network slice, and the RIC control may be performed.

Referring to FIG. 11B, while the set-up procedure, the RIC subscription procedure, the RIC indication message transfer procedure, and the RIC control message transfer procedure have been described in sequence, various embodiments of the disclosure are not limited to the above-mentioned sequence and procedures. That is, in some embodiments, the E2 node and the RIC may independently perform the E2 setup procedure. In some embodiments, the E2 node and the RIC may independently perform the subscription procedure. Meanwhile, according to another embodiment, the E2 setup response message may include the subscription request message, as mentioned above. In some embodiments, the E2 node and the RIC may independently perform the RIC indication procedure. Also, in some embodiments, the E2 node and the RIC may independently perform the RIC control procedure. Besides, the E2 node and the RIC may perform at least part of the above-stated procedures together or individually.

Figure 12A:
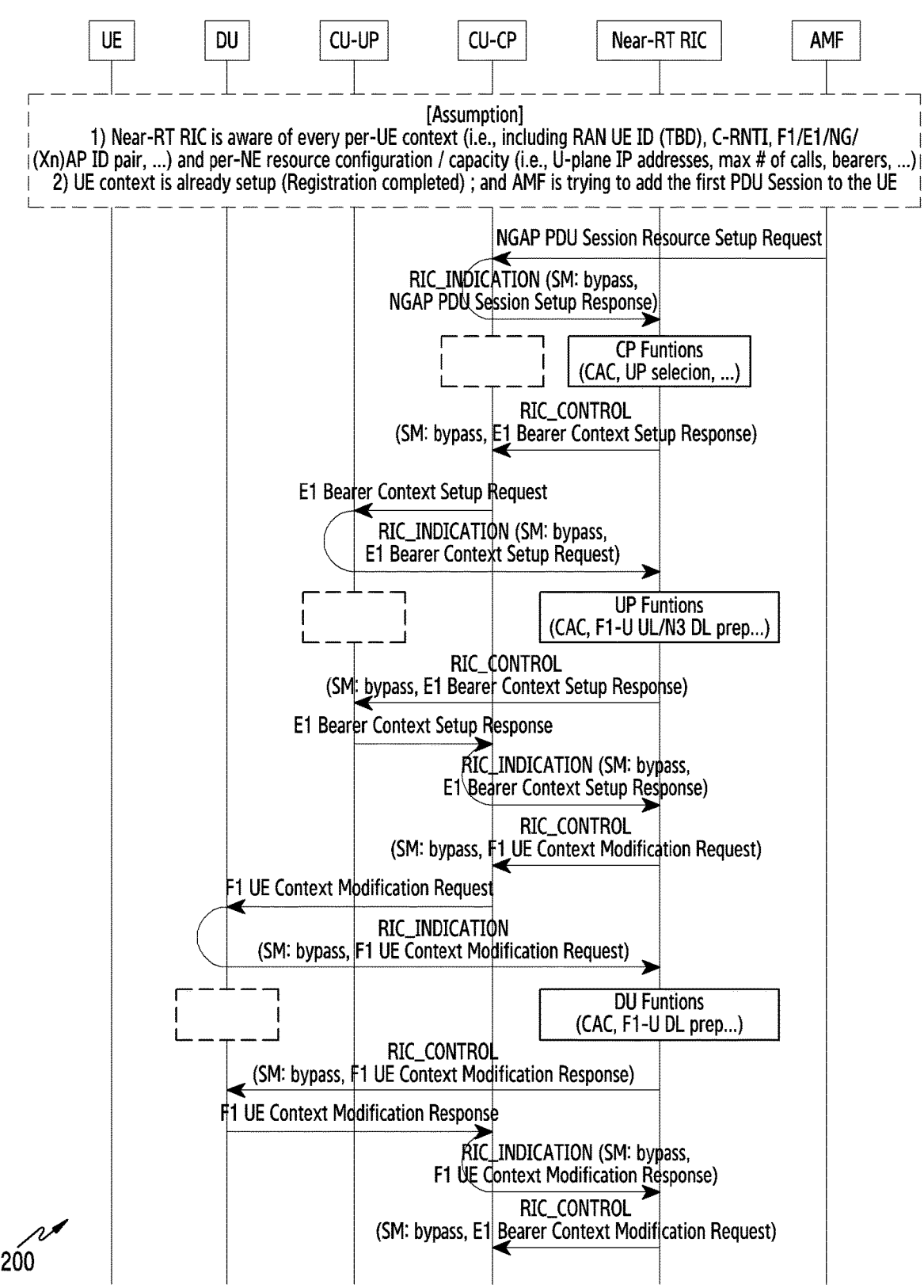
FIGS. 12A and 12B illustrate signalings for RIC-based RRM control according to embodiments of the disclosure.
Figure 12B:
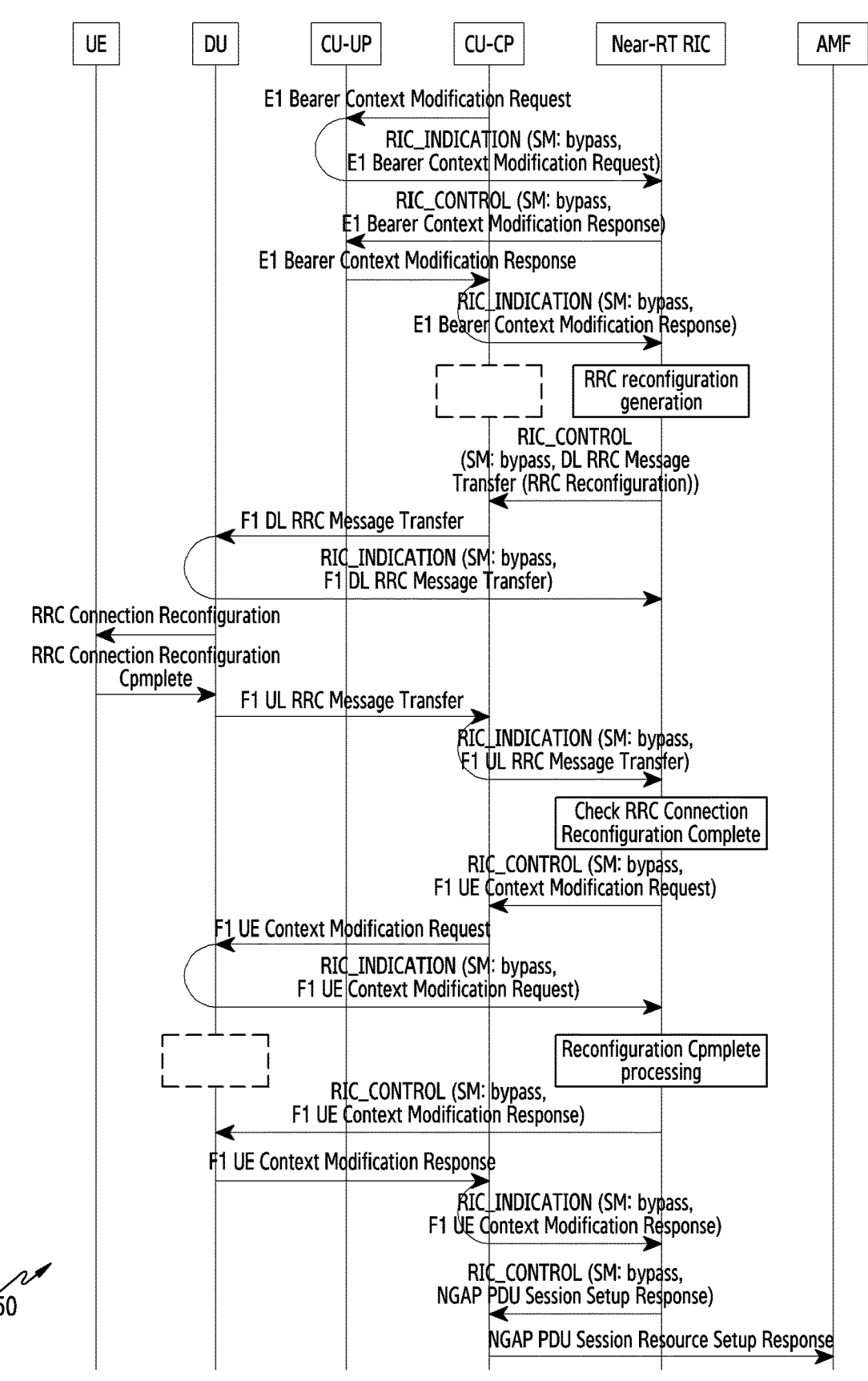

FIGS. 12A and 12B illustrate signalings 1200 and 1250 for RIC-based RRM control according to various embodiments of the disclosure. The load balancing (e.g., MLB) between different vendors is conducted through the RRM control.

Referring to FIGS. 12A and 12B, a single E2 node is depicted, but a plurality of E2 nodes, particularly, E2 nodes of different vendors may be applied in the same manner. Even if the vendors are different, the RRM control may be more efficiently fulfilled through the control by the RIC.

Referring to FIGS. 12A and 12B, the RIC may process the following messages/procedures, to execute the functions of the E2 node instead.

(1) NGAP protocol data unit (PDU) Session Resource Setup Request
(2) E1 bearer Context Setup Request
(3) E1 bearer Context Setup Response
(4) F1 UE Context Modification Request
(5) F1 UE Context Modification Response
(6) E1 Bearer Context Modification Request
(7) E1 Bearer Context Modification Response
(8) DL RRC Message Transfer
(9) F1 UE RRC Message Transfer

(10) F1 UE Context Modification Request
(11) F1 UE Context Modification Response
(12) NGAP PDU Session Resource Setup Response If the AMF transmits a message to the E2 node, the E2 node may forward the corresponding message to the RIC. That is, the E2 node may bypass and forward the corresponding message to the RIC, such that the RIC interprets/processes/determines the corresponding message. Blanks shown in FIGS. 12A and 12B indicate that the near-RT RIC performs the functions of each E2 node instead. The RIC may improve an intelligence-aided function, to perform operations for the RRM such as interpreting/processing/determining of the message.

FIGS. 12A and 12B have been enumerated in chronological order, which are merely to explain the operations of the E2SM-RIC according to various embodiments of the disclosure, but do not intend to limit performing specific signaling before other signaling as an essential component. That is, according to another embodiment, some of the procedures shown in FIGS. 12A and 12B may be omitted. According to yet another embodiment, some signalings may be performed by the RIC at a time. In addition, the example of processing the messages of (1) through (2) is illustrated in FIGS. 12A and 12B, but embodiments of the disclosure are not limited thereto. Some of the aforementioned examples may be interpreted/determined/processed by the RIC but other some may be performed by the E2 node as in the conventional manner.

Hereinafter, in FIGS. 13A to 13C, in order to perform the RIC control procedure according to embodiments of the disclosure, a setup procedure and a subscription procedure between the E2 node and the RIC, and the RIC control procedure are described.

FIG. 13A illustrates signaling of a setup procedure between an E2 node and an RIC according to an embodiment of the disclosure. Here, RIC may mean near-RT RIC.

Referring to FIG. 13A, in operation 1301, the E2 node may transmit an E2 SETUP REQUEST message to the RIC. The E2 NODE FUNCTION function located in the E2 node may find the RIC using the IP address of the RIC set as operation-administration-maintenance (OAM) and transmit the E2 setup request message. The E2 setup request message may include information on an RAN function supported by the E2 node (e.g., RAN Function Definition), E2 node ID information, and the like. According to an embodiment, the RAN Function Definition value is a value set to OAM. As an example, the RAN Function Definition value may include a STYLE ID value. The RIC may determine which call processing function the E2 node supports based on the RAN Function Definition value by receiving information on the set value through OAM.

According to an embodiment, the RAN Function Definition may be configured in the IE format shown in FIG. 13A. The RAN Function Definition may include information on the RIC event trigger style and information on the RIC control style. According to an embodiment, the RAN Function Definition of the E2 setup request message is a capability of the E2 node, and may include information on allowed control actions. RAN Function Definition is an ID for an allowed Control Action (e.g., Allowed Control Action ID), a name for an allowed Control Action (e.g., Allowed Control Action Name), information about parameters related to an allowed Control Action (e.g., Sequence of Associated RAN Parameters). For example, if the RIC Control Style is 'Dual Connectivity' (e.g., RIC Style type=5 in FIG. 18), the corresponding SgNB control operation (e.g., SgNB Addition/SgNB Modification/SgNB Release) is the Control Action ID and can be defined together. Meanwhile, the table shown in FIG. 13A only shows an example of the RAN Function Definition IE included in the E2 SETUP REQUEST message of the disclosure, and is not construed as limiting other embodiments of the disclosure.

In operation 1303, the RIC may receive an E2 SETUP RESPONSE message from the E2 node. The RIC may determine whether it is acceptable to accept the E2 setup request message sent by the E2 node. The RIC may transmit an E2 setup response message to the E2 node if it is possible to accept the E2 setup request message.

After performing the E2 SETUP procedure shown in FIG. 13A, one or more functions for the RIC to control the E2 node may be configured. Through this, the RIC can provide a control service to the E2 node. The RIC may control the E2 node to perform at least one of allowed (or configured) Control Actions through the E2 SETUP procedure.

Figure 13B:
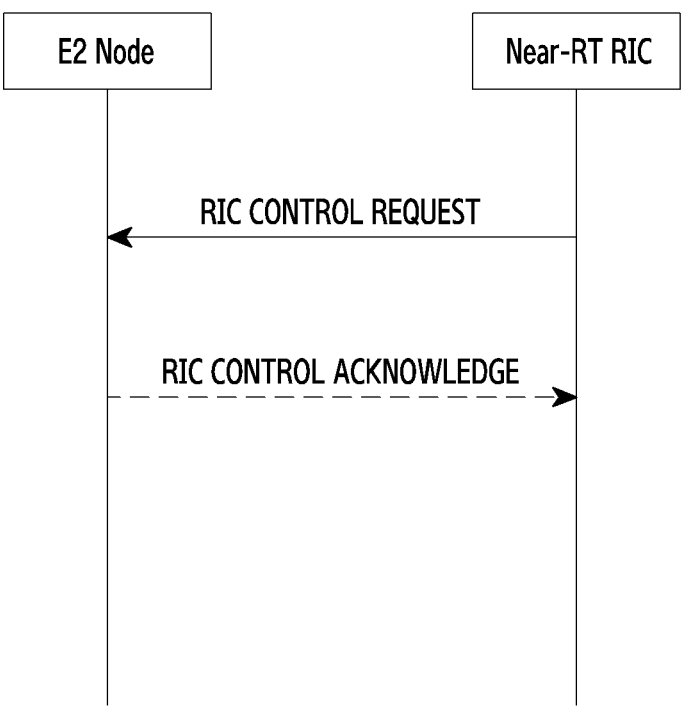
FIG. 13B illustrates signaling of a control procedure between an E2 node and an RIC according to an embodiment of the disclosure.

FIG. 13B illustrates signaling of a control procedure between an E2 node and an RIC according to an embodiment of the disclosure. FIG. 13B illustrates the RIC control request procedure defined in the O-RAN standard.

Referring to FIG. 13B, the RIC may transmit an RIC control request message to the E2 node. Herein, the RIC may be the near-RT RIC. The RIC transmits the RIC control request message to the E2 node in calling, to support the RAN control action defined in the E2 service model (E2SM). In the message transmission, RIC control request acknowledge support may be selected. In so doing, the E2 node needs to transmit a control request acknowledgement message to the RIC.

The E2 node may transmit an RIC control acknowledge message to the RIC. As mentioned earlier, if an RIC control ack request IE which is set to "Ack" is included in the RIC control request message and the E2 node successfully processes the requested RIC control procedure task, the E2 node needs to respond with the RIC control acknowledge message.

If receiving the RIC control acknowledge message, the RIC may stop a timer TRICcontrol and finish the RIC control procedure. To determine follow-up measures, the RIC may use information included in an RIC control status IE and an RIC control outcome IE. The RIC control outcome IE may be optional.

The RIC control procedure in FIG. 13B may be performed in connection with the E2 subscription procedure as well as the E2 setup procedure of FIG. 13A. Hereinafter, an example of a situation in which the RIC control procedure is performed in connection with the E2 subscription procedure will be described with reference to FIG. 13C.

Figure 13C:
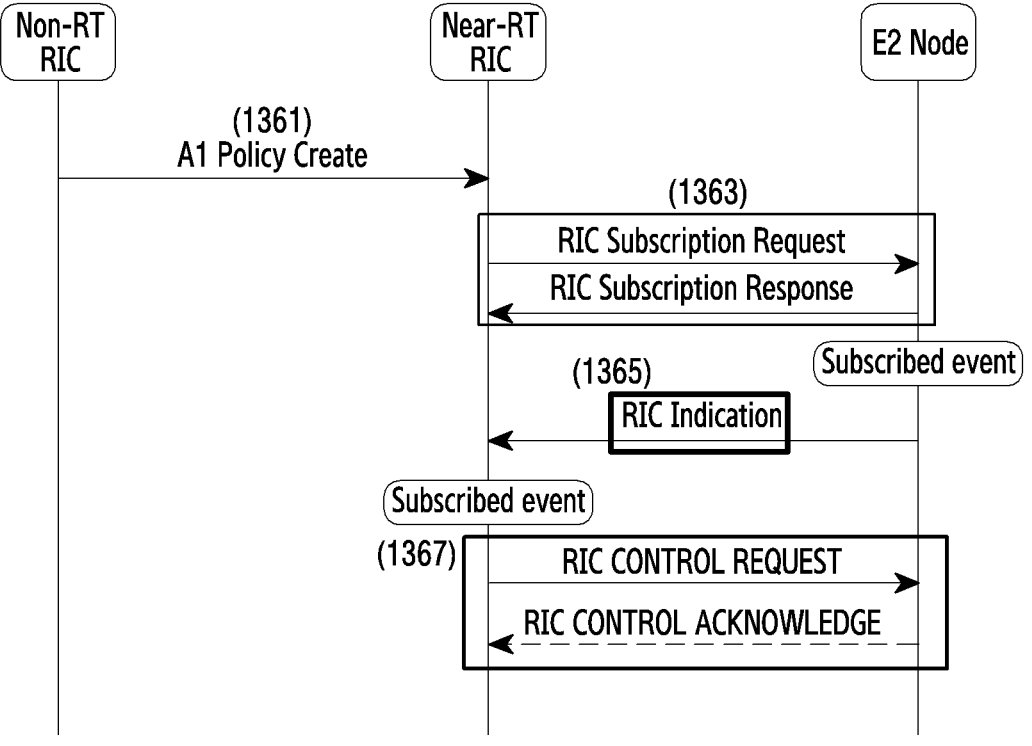
FIG. 13C illustrates signaling of a subscription procedure between an E2 node and an RIC according to an embodiment of the disclosure.

FIG. 13C illustrates signaling of a subscription procedure between an E2 node and an RIC according to embodiments of the disclosure. FIG. 13C illustrates signaling of an entire control procedure between an E2 node, an RIC, and a Non-RT RIC according to embodiments of the disclosure.

Referring to FIG. 13C, in operation 1361, the Non-RT RIC may transmit a Policy for controlling the Near-RT RIC to the E2 Node by using an A1 Interface to the RIC. The A1 interface may be defined between the Non-RT RIC and the near RT RIC. The A1 policy includes at least one of a policy for each UE, a policy for each group, a policy for each cell, or a policy for each slice, and the A1 policy may be variously configured for each service. The RIC may perform the RIC subscription procedure based on the A1 policy received in the A1 Policy message. The A1 policy create message may include, for example, a JavaScript Object Notation (JSON) message format. For example, in case of setting a policy for a specific UE, the A1 policy create message may include a UE ID. Also, for example, in case of setting a policy for a specific cell, the A1 policy create message may include a cell ID. Also, for example, in case of controlling QoS, the A1 policy create message may include GBR related to QoS.

In operation 1363, the RIC may transmit an RIC subscription request to the E2 node. The E2 node may transmit an RIC subscription response message to the RIC. RIC creates an RIC Subscription request in the subscription process. The RIC Subscription request is a message for actually configuring a SERVICE for controlling the E2 node. In general, in order to control the E2 node, the RIC may request subscription of the REPORT service and the CONTROL service for receiving measurement from the E2 node. According to an embodiment, a specific xApp located in the RIC requests an RIC E2 end function to subscribe to a specific RAN Function Definition function supported by E2. The E2 node function of the E2 node may decode the subscription request message. After the RIC successfully configures the event condition requested by the E2 node function, the E2 node function of the E2 node may transmit to the RIC that the event trigger condition has been successfully configured through a response to the subscription request.

For REPORT service and CONTROL service subscription, one RIC subscription procedure (one RIC Subscription Request and RIC Subscription Response) may be used. However, unlike shown in FIG. 13C, RIC Subscription Request and RIC Subscription Response are exchanged between RIC and E2 node for subscription of REPORT service, and for subscription of CONTROL service, RIC Subscription Request and RIC Subscription Response are additionally RIC and may be exchanged between E2 nodes.

In operation 1365, the E2 node may transmit an RIC indication (or RIC Control Indication) to the RIC. When an event specified in the subscribed REPORT SERVICE occurs in operation 1363, the E2 node may include related measurement data in the RIC Indication message and transmit the RIC Indication message to the RIC. For example, when a specific event condition occurs, the E2 node 610 may transmit an E2 RIC indication message to the RIC 640. According to an embodiment, a message container of the RIC indication message may include a KPI reporting service model in a unit of UE.

In operation 1367, the RIC may perform an RIC control procedure. The RIC may transmit a control request message (RIC CONTROL REQUEST) to the E2 node. The E2 node may send an RIC control acknowledgment (RIC CONTROL ACKNOWLEDGE) to the RIC. The RIC control procedure may correspond to the control procedure of FIG. 13B.

The RIC may transmit the RIC CONTROL REQUEST message to the E2 node when the received measurement data meets the subscribed CONTROL SERVICE condition. RIC CONTROL REQUEST may include settings necessary to control the E2 node. For example, for dual connectivity configuration, IEs and target cell IEs related to SgNB addition Request defined in 3GPP may be delivered. Also, for example, for data radio bearer (DRB) control, a DRB ID and an IE related to an F1 Interface message may be transmitted. The E2 node may transmit the RIC CONTROL ACKNOWLEDGE message according to embodiments of the disclosure to the RIC as a response.

FIG. 14A illustrates an example of an RIC control request message format according to an embodiment of the disclosure. FIG. 14A illustrates the RIC control request message format specified in the O-RAN standard.

The message type is a type number specified per message type in the standard, the RIC request ID is an ID for uniquely managing a corresponding message at the RIC, and the RAN function ID is an ID for identifying a control target function in the E2 node. Besides, the RIC call process ID selectively transmitted is an ID for identifying a previous process. The RIC control header and the RIC control message carry and transmit a message for controlling the RAN function. The RIC according to embodiments of the disclosure may request an RIC control acknowledge message which selectively transmits whether a corresponding action is successful to the E2 node with the RIC control ack request IE. That is, if requesting the RIC control ack message from the E2 node, the RIC may include the RIC control ack request IE in the RIC control request message. If the RIC does not include the RIC control ack request IE in the RIC control request message, it may be interpreted that the RIC does not request the RIC control ack message from the E2 node.

FIG. 14B illustrates an example of the RIC control acknowledge message format according to an embodiment of the disclosure. FIG. 14B illustrates the control acknowledged which is a response message of the control message defined in the O-RAN standard. The message type is the type number specified per message type in the standard, the RIC request ID is the ID for uniquely managing a corresponding message at the RIC, and the RAN function ID is the ID for identifying a control target function in the E2 node. Besides, the RIC call process ID selectively transmitted is the ID for identifying the previous process.

According to embodiments of the disclosure, the RIC control status may indicate the status in the RIC control request message previously requested. The message status may be expressed as one of success, rejected, failure, or a partial success status. The E2 node may transmit a corresponding control action outcome through the RIC control outcome (the corresponding IE may be referred to as the RIC control outcome). A substantial control action outcome may be defined in an octet string container form of the RIC control outcome in the E2 service model. For example, the IE of the RIC control outcome may be exemplified as shown in the following Table 1.

TABLE 1

9.2.25 RIC Control Outcome
This information element carries the RIC Control Outcome.

| IE/Group Name | Presence | Range | IE type and reference | Semantics description |
|---|---|---|---|---|
| RIC Control Outcome | M | | OCTET STRING | Defined in RAN Function specific E2 Service Model [3] |

Herein, the reference [3] indicates O-RAN-WG3.E2SM: "0-RAN Working Group 3, Near-Real-time RAN Intelligent Controller, E2 Service Model (E2SM)." The service indicated by the RIC control outcome is related to the RAN function. Herein, the RAN function may rely on the E2 service model (E2SM).

FIG. 15 illustrates an example of an 'E2SM-RC control outcome' IE format in an RIC control acknowledge message according to an embodiment of the disclosure. FIG. 15 illustrates the example of Control Outcomes message format 1 transferred in the single octet string container form in the RIC control acknowledge defined in the disclosure regardless of Success or Failed and the example of Control Outcomes message format 2 designed in a form that the fields of successful cause and failed causes are independently configured and can be transmitted together. The Control Outcomes message format is expandable, and an additional format may be defined. RAN function specific E2 service model (E2SM) specifications may be recommended to include explanations of the IE to be used in the RIC control service. The choice format which enumerates one or more RIC control outcome formats may be adopted.

FIG. 16A through FIG. 16C illustrate examples of an RIC control acknowledge message for carrying a cause IE according to various embodiments of the disclosure.

FIG. 16A elucidates the message of the E2SM-RC control outcome format 1. The message may include a maxnoof-ControOutcome number set. Each information of the set may include one UE ID and a sequence set related to the UE. Each information of the sequence set may include the RAN parameter ID and the RAN parameter container of the maxnoofControOutcome number. That is, the control outcome format1 may be defined by repeating the control outcomes in the sequence form as many as the number defined in maxnoofControOutcome. The RAN parameter ID and the RAN parameter container may be defined by repeating as many as the number defined in maxnoofControlAck-RANResources with respect to one UE for each sequence.

The parameter ID shown in FIG. 16B is a function for the RAN control defined in the standard per RAN control. For example, the RAN parameter ID may be defined to an integer value from 1 to 4294967296. FIG. 16C illustrates a failure cause defined in the 3GPP defined per parameter ID.

FIG. 16C may indicate the RAN parameter ID and information of the RAN parameter container corresponding to the corresponding parameter ID. The tables shown in FIG. 16C are exemplary, and are not interpreted to limit embodiments of the disclosure. The RAN parameter ID may define an additional value as well as 12, and some details of the tables may be changed according to standard addition/change/modification.

Referring to FIG. 16C, according to an embodiment, the RAN parameter ID may indicate 'QoS Flow Failed to Setup List' (e.g., '1'). The RAN parameter container may include QoS Flow ID of 'QoS Flow Failed to Setup List'.

According to an embodiment, the RAN parameter ID may indicate 'QoS Flow Failed to Modify List t' (e.g., '2'). The RAN parameter container may include QoS Flow Failed to Modify List IE of 'QoS Flow Failed to Modify List'.

According to an embodiment, the RAN parameter ID may indicate 'QoS Flow Failed to Setup List' (e.g., '3'). The RAN parameter container may include DRB Failed to Setup List IE of 'DRB Failed to Setup List'.

According to an embodiment, the RAN parameter ID may indicate 'DRB Failed to be Modified List' (e.g., '4'). The RAN parameter container may include 'DRB Failed to be Modified List IE' of 'DRB Failed to be Modified List'.

According to an embodiment, the RAN parameter ID may indicate 'FLAP Cause' (e.g., '5'). The RAN parameter container may include the cause IE defined in 3GPP TS 38.473.

According to an embodiment, the RAN parameter ID may indicate 'E1AP Cause' (e.g., '6'). The RAN parameter container may include the cause IE defined in 3GPP TS 38.463.

According to an embodiment, the RAN parameter ID may indicate 'XnAP Cause' (e.g., '7'). The RAN parameter container may include the cause IE defined in 3GPP TS 38.423.

According to an embodiment, the RAN parameter ID may indicate 'NGAP Cause' (e.g., '8'). The RAN parameter container may include the cause IE defined in 3GPP TS 38.413.

According to an embodiment, the RAN parameter ID may indicate 'X2AP Cause' (e.g., '9'). The RAN parameter container may include the cause IE defined in 3GPP TS 36.423.

According to an embodiment, the RAN parameter ID may indicate 'W1AP Cause' (e.g., '10'). The RAN parameter container may include the cause IE defined in 3GPP TS 37.473.

According to an embodiment, the RAN parameter ID may indicate 'SLAP Cause' (e.g., '11'). The RAN parameter container may include the cause IE defined in 3GPP TS 36.473.

According to an embodiment, the RAN parameter ID may indicate an interface name. Although not defined in the 3GPP standard (e.g., configured in implementation), a cause value for indicating the failure reason may be defined. At this time, to refer to an interface associate with the corresponding reason, 'Interface Name' may be defined. 'Interface Name' may be configured to indicate the interface such as F1/E1/Xn/X2/W1.

Figure 17:
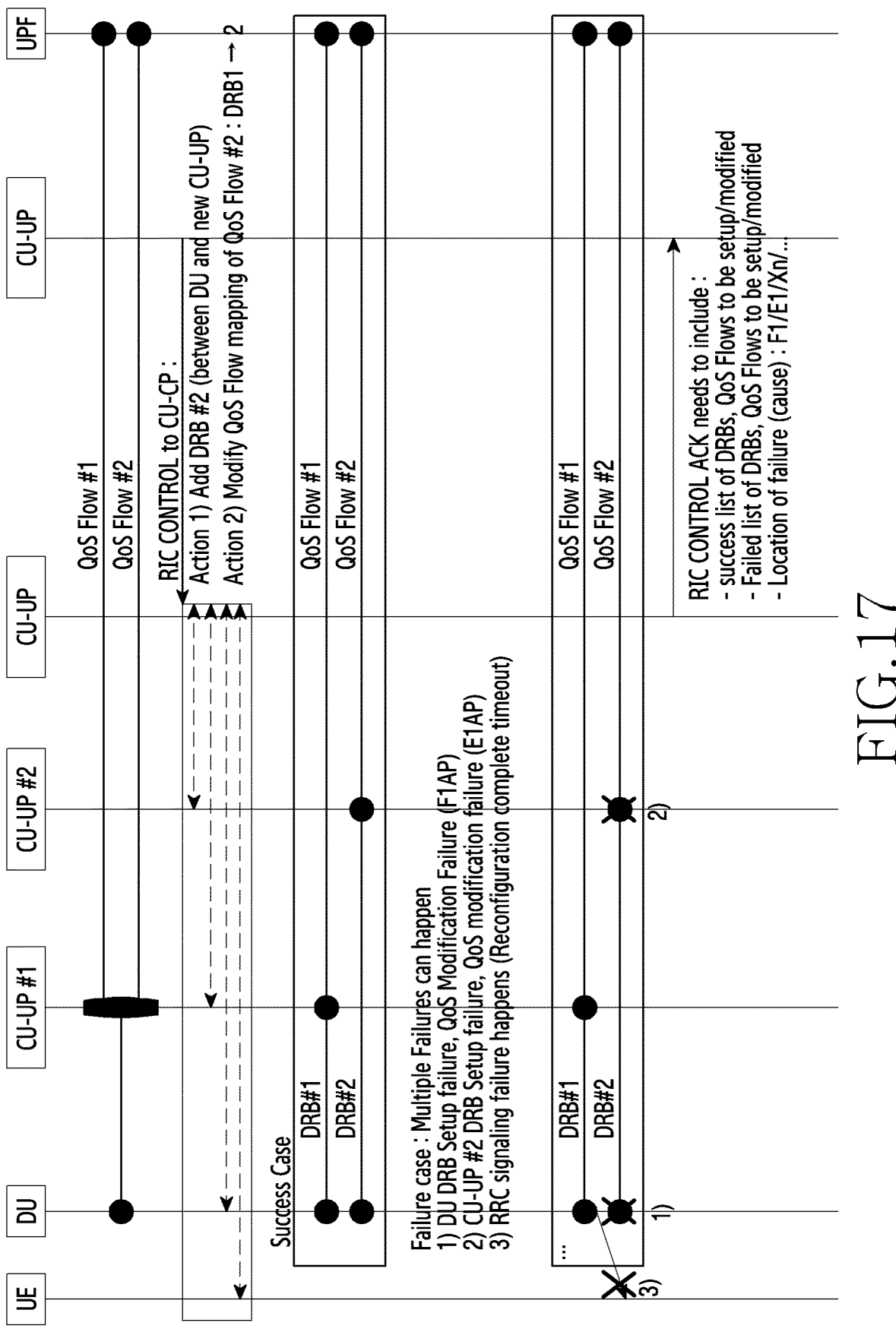
FIG. 17 illustrates an example of subsequent actions of an RIC action according to an embodiment of the disclosure.

FIG. 17 illustrates an example of subsequent actions of an RIC action according to an embodiment of the disclosure. FIG. 17 is an embodiment for supporting more intelligent subsequent action at the RIC by use of the present message format. First, it is assumed that two QoS flows are mapped to a data radio bearer (DRB) #1. Next, the RIC may detect that the QoS flow #2 of two QoS flows needs to communicate with a separate CU-UP through a separate DRB (e.g., needs to change an anchoring point for CU-UP in the midhaul between the DU and the CU-UP and in backhaul between the CU-UP and the UPF). Hence, it is required to additionally generate the DRB #2 in the DU (Action 1) and then to re-map the QoS flow and the DRB #2 (Action 2). The corresponding action involves several entities (associated actions with DU, CU-UP #2, CU-CP and 5GC) in terms of the RIC, and may occur at various locations even if the corresponding action fails. However, if failure occurs and a failure reason is not clearly transferred to the RIC, recovery may be delayed due to the repeated failures.

According to the current standard, if such failure occurs, it is impossible to transfer information of the accurate failure location. For example, additional modification to the existing format is inevitable to transfer detailed information such as whether the DRB #2 generation fails due to connection admission control (CAC) failure in the DU, whether it fails due to no routing user plane tunnel address in the CU-UP, whether the RRC signals fails, which CU-UP fails in generation, and which I/F fails. If it is possible to transfer this additional information using the suggested format, the RIC may address the failure reason more efficiently. For example, if the DRB setup fails due to the CAC failure of the DU, the RIC may prevent the CAC failure by allowing the DRB setup to other DU than the corresponding DU. In addition, for example, if connection on the transport layer of the CU-UP is problematic, the RIC may guide to re-adjust the user plane by adjusting a software defined networking (SDN) controller through interworking with an entity which manages the transport, or may assist in coverage optimization through additional analysis on the RRC reconfiguration fail action.

Although not depicted in FIG. 17, the scenario where the RIC more efficiently controls the E2 node thorough the failure reason may be configured more variously. The RIC may perform the DU control in the CU-DU split structure, the DU bandwidth control, the per-service control, as well as the DRB and QoS mapping.

FIG. 18 illustrates an example of an RIC style type according to an embodiment of the disclosure. Through FIG. 18, an example of the RIC Control Service Style in which the RIC can control the E2 node with RAN Control is described. Any supportable RIC Control Service Style for the embodiments of the disclosure, as well as the examples of the Service Style shown in FIG. 18, may be additionally considered.

FIG. 19 illustrates another example of an RIC control acknowledgment message for delivering a Cause IE according to an embodiment of the disclosure. An example of a message of E2SM-RC Control Outcome Format 2 will be described in detail with reference to FIG. 19. A control action corresponding to a Control Action ID for which control is requested through the RIC Control Request may be associated with one or more RAN parameter IDs. At this time, success or failure (or rejection) may be determined for each RAN parameter ID. For example, for dual connectivity control, one control operation of SgNB Addition/Modify/Release may be configured. Success or failure (or rejection) may be determined for each gNB to be added. The cause of FIG. 16C may be equally included in the RAN parameter container of the embodiment described with reference to FIG. 19. That is, the embodiment described with reference to FIG. 19 may refer to Cause-related IEs and RAN parameter ID of FIG. 16C.

Referring to FIG. 19, the message may include information on the RIC Style Type. That is, the message may be dependent on the RIC Style Type. According to an embodiment, the message may include a set of maxnoofControlOutcome number for each style of RIC Control Service. Each information in the set may include one UE ID and a sequence set of Success and a sequence set of Failure related to the UE. Each information in the sequence set may include an RAN parameter ID and an RAN parameter container. The sequence set of Success may include RAN parameter IDs and RAN parameter containers as many as maxnoofControlAckRANResources1 number. In addition, the sequence set of Failure may include RAN parameter IDs and RAN parameter containers as many as maxnoofControlAckRANResources2 number.

According to an embodiment, the message (e.g., RIC Control Outcome of RIC Control Confirmation message) may include only a sequence set of Success. At this time, RIC Control Status may be configured to indicate Success. Also, according to an embodiment, the message (e.g., RIC Control Outcome of the RIC control confirmation message) may include only a sequence set of Failure. At this time, the RIC Control Status may be configured to indicate Failure (or Rejected).

Also, according to an embodiment, the message (e.g., RIC Control Outcome of the RIC control confirmation message) may include both a sequence set of Success and a sequence set of Failure. At this time, the number of RAN parameter IDs and RAN parameter containers included in the sequence set is independent between the sequence set of Success and the sequence set of Failure. That is, maxnoofControlAckRANResources1 may be the same as or different from maxnoofControlAckRANResources2. At this time, the RIC Control Status may be configured to indicate partial success.

Control Outcomes according to Control Outcome Format2 can be defined repeatedly as many as the number defined in maxnoofControlOutcome in the form of 'Sequence of Successful outcome of RAN CONTROL' and 'Sequence of Failed outcome of RAN CONTROL'. For each sequence, for one user equipment (UE), RAN Parameter ID and RAN Parameter Container can be repeatedly defined for Success RAN CONTROL and Failed RAN CONTROL as many as the number defined in maxnoofControlAckRAN-Resources (or maxnoofControlAckRANResources1 and maxnoofControlAckRANResources2).

According to an embodiment, the RIC may detect difficulty of the DU in the UE service due to the lack of the cell capacity. In this case, the RIC may change the DU for the access, rather than repeatedly controlling the access through the DU.

According to an embodiment, the RIC may detect that a currently provided cell is insufficient to support a corresponding QoS class identifier (QCI). To provide a sufficient-quality service, the RIC may control to hand over the UE, or control to change the CU or the DU to a CU or a DU determined to be closer to the UE.

According to an embodiment, if the bandwidth provided for the current service is not sufficient and a corresponding function (e.g., RAN function ID specific to E2 SM) fails, the RIC may configure an additional cell. For example, the RIC may perform an addition procedure of a secondary node (SN) for DC connection, or perform a modification procedure of the SN. In addition, for example, the RIC may control the E2 node to provide the service with a cell having a relatively wide bandwidth through cell group reconfiguration.

According to an embodiment, if handover to a target cell is not allowed, the RIC may control the E2 node to hand over to another target cell. For example, for the inter-DU mobility support, the RIC may control the CU to service a specific UE with a new DU.

As shown in the above examples, the RIC may more efficiently control the E2 node, by obtaining the reason of the failure (the function failure corresponding to a specific RAN function ID in the service model) of various service functions. The required RIC action may be triggered, through the cause IE (or failure information) of the RIC control acknowledge message reported by the E2 node.

Inter-process communication (IPC) cost may reduce, under the RRM control of the RIC according to various embodiments of the disclosure. In particular, if the DU/CU/RIC is located in the same environment, message relay cost may be reduced. The RIC may perform all the things except the message transfer, and thus a reciprocity problem according to the operations between the vendors may be addressed. In addition, the intelligent function of the RIC may be updated, to replace a specific function between the CU-UPs.

According to an example embodiment of the disclosure, a method performed by a radio access network (RAN) intelligent controller (RIC), the method comprising: receiving, from a E2 node, a setup request message including RAN function information specific to service model, the RAN function information including information on one or more control actions; transmitting, to the E2 node, a setup response message; transmitting, to the E2 node, an RIC control request message; and receiving, from the E2 node, an RIC control acknowledge message, wherein the RIC control request message includes identification information of a control action among the one or more control actions, wherein the RIC control acknowledge message includes RIC control outcome information for the control action, and wherein the RIC control outcome information includes a reason of an event for the control action in a specific protocol.

In some embodiment, wherein the event for the control action comprises a failure or a rejection of the control action.

In some embodiment, wherein the RIC control outcome information includes an RAN parameter identifier (ID) and an RAN parameter container, wherein the RAN parameter ID indicates the specific protocol, a quality of service (QoS) flow, or a data radio bearer (DRB), and wherein the RAN parameter container comprises information on the reason.

In some embodiment, wherein the RIC control outcome information includes information on a style of an RIC control service, and wherein the style of the RIC control service includes at least one of a radio bearer control, a radio resource allocation, a connected mode mobility, a radio access control, a dual connectivity, a carrier aggregation, or an idle mode mobility control.

In some embodiment, wherein the RIC control outcome information includes at least one of success sequence information for the style of the RIC control service or failure sequence information for the style of the RIC control service, wherein the success sequence information includes an RAN parameter identifier (ID) and an RAN parameter container per successfully performed control action, and wherein the failure sequence information includes an RAN parameter ID and RAN parameter container per failed control action.

According to an example embodiment of the disclosure, a method performed by a E2 node, the method comprising: transmitting, to a radio access network (RAN) intelligent controller (RIC), a setup request message including RAN function information specific to service model, the RAN function information including information on one or more control actions; receiving, from the RIC, a setup response message; receiving, from the RIC, an RIC control request message; and transmitting, to the RIC, an RIC control acknowledge message, wherein the RIC control request message includes identification information of a control action among the one or more control actions, wherein the RIC control acknowledge message includes RIC control outcome information for the control action, and wherein the RIC control outcome information includes a reason of an event for the control action in a specific protocol.

In some embodiment, wherein the event for the control action comprises a failure or a rejection of the control action.

In some embodiment, wherein the RIC control outcome information includes an RAN parameter identifier (ID) and an RAN parameter container, wherein the RAN parameter ID indicates the specific protocol, a quality of service (QoS) flow, or a data radio bearer (DRB), and wherein the RAN parameter container comprises information on the reason.

In some embodiment, wherein the RIC control outcome information includes information on a style of an RIC control service, and wherein the style of the RIC control service includes at least one of a radio bearer control, a radio resource allocation, a connected mode mobility, a radio access control, a dual connectivity, a carrier aggregation, or an idle mode mobility control.

In some embodiment, wherein the RIC control outcome information includes at least one of success sequence information for the style of the RIC control service or failure sequence information for the style of the RIC control service, wherein the success sequence information includes an RAN parameter identifier (ID) and an RAN parameter container per successfully performed control action, and wherein the failure sequence information includes an RAN parameter ID and RAN parameter container per failed control action.

According to an example embodiment of the disclosure, an apparatus of a radio access network (RAN) intelligent controller (RIC), comprising: at least one transceiver; and at least one processor, wherein the at least one processor is configured to control the at least one transceiver to: receive, from a E2 node, a setup request message including RAN function information specific to service model, the RAN function information including information on one or more control actions, transmit, to the E2 node, a setup response message, transmit, to the E2 node, an RIC control request message, and receive, from the E2 node, an RIC control acknowledge message, wherein the RIC control request message includes identification information of a control action among the one or more control actions, wherein the RIC control acknowledge message includes RIC control outcome information for the control action, and wherein the RIC control outcome information includes a reason of an event for the control action in a specific protocol.

In some embodiment, wherein the event for the control action comprises a failure or a rejection of the control action.

In some embodiment, wherein the RIC control outcome information includes an RAN parameter identifier (ID) and an RAN parameter container, wherein the RAN parameter ID indicates the specific protocol, a quality of service (QoS) flow, or a data radio bearer (DRB), and wherein the RAN parameter container comprises information on the reason.

In some embodiment, wherein the RIC control outcome information includes information on a style of an RIC control service, and wherein the style of the RIC control service includes at least one of a radio bearer control, a radio resource allocation, a connected mode mobility, a radio access control, a dual connectivity, a carrier aggregation, or an idle mode mobility control.

In some embodiment, wherein the RIC control outcome information includes at least one of success sequence information for the style of the RIC control service or failure sequence information for the style of the RIC control service, wherein the success sequence information includes an RAN parameter identifier (ID) and an RAN parameter container per successfully performed control action, and wherein the failure sequence information includes an RAN parameter ID and RAN parameter container per failed control action.

According to an example embodiment of the disclosure, An apparatus of a E2 node, comprising: at least one transceiver; and at least one processor, wherein the at least one processor is configured to control the at least one transceiver to: transmit, to a radio access network (RAN) intelligent controller (RIC), a setup request message including RAN function information specific to service model, the RAN function information including information on one or more control actions, receive, from the RIC, a setup response message, receive, from the RIC, an RIC control request message, and transmit, to the RIC, an RIC control acknowledge message, wherein the RIC control request message includes identification information of a control action among the one or more control actions, wherein the RIC control acknowledge message includes RIC control outcome information for the control action, and wherein the RIC control outcome information includes a reason of an event for the control action in a specific protocol.

In some embodiment, wherein the event for the control action comprises a failure or a rejection of the control action.

In some embodiment, wherein the RIC control outcome information includes an RAN parameter identifier (ID) and an RAN parameter container, wherein the RAN parameter ID indicates the specific protocol, a quality of service (QoS)

flow, or a data radio bearer (DRB), and wherein the RAN parameter container comprises information on the reason.

In some embodiment, wherein the RIC control outcome information includes information on a style of an RIC control service, and wherein the style of the RIC control service includes at least one of a radio bearer control, a radio resource allocation, a connected mode mobility, a radio access control, a dual connectivity, a carrier aggregation, or an idle mode mobility control.

In some embodiment, wherein the RIC control outcome information includes at least one of success sequence information for the style of the RIC control service or failure sequence information for the style of the RIC control service, wherein the success sequence information includes an RAN parameter identifier (ID) and an RAN parameter container per successfully performed control action, and wherein the failure sequence information includes an RAN parameter ID and RAN parameter container per failed control action.

According to an example embodiment of the disclosure, a method performed by a near-RT (real time) RIC (radio access network (RAN) intelligent controller (RIC)), the method comprising: transmitting, to a E2 node, an RIC control request message including information on a control action identity (ID), and receiving, from the E2 node, an RIC control acknowledge message or an RIC control failure message in response to the RIC control request message, wherein the RIC control acknowledge message or the RIC control failure message includes information on an RIC control outcome, wherein the information on the RIC control outcome includes at least one set of RAN parameter, wherein each of the at least one set of RAN parameter includes a RAN parameter ID and a RAN parameter value.

In some embodiment, wherein the RIC control request message includes information on a style of RIC control service, wherein the style of RIC control service is one of a plurality of styles including: a radio bearer control, a radio resource allocation, a connected mode mobility, a radio access control, a dual connectivity, a carrier aggregation, or an idle mode mobility control.

In some embodiment, in case that the style of RIC control service is the radio bearer control: wherein the RAN parameter ID of the information of the RIC control outcome indicates a DRB (data radio bearer), and wherein the RAN parameter value of the information of the RIC control outcome includes a value of the DRB ID.

In some embodiment, the method further comprising: receiving, from the E2 node, a E2 setup request message including information on a RAN function definition specific to a service model, and transmitting, to the E2 node, a E2 setup response message, wherein the information on the RAN function definition includes a control action ID, a control action name, and a sequence of associated RAN parameters for a control action.

In some embodiment, wherein the information on the RIC control outcome includes information on a failure cause in case that an RIC control request is failed.

According to an example embodiment of the disclosure, a method performed by a E2 node, the method comprising: receiving, from a near-RT (real time) RIC (radio access network (RAN) intelligent controller (RIC)), an RIC control request message including information on a control action identity (ID), and transmitting, to the near-RT RIC, an RIC control acknowledge message or an RIC control failure message in response to the RIC control request message, wherein the RIC control acknowledge message or the RIC control failure message includes information on an RIC control outcome, wherein the information on the RIC control outcome includes at least one set of RAN parameter, wherein each of the at least one set of RAN parameter includes a RAN parameter ID and a RAN parameter value.

In some embodiment, wherein the RIC control request message includes information on a style of RIC control service, wherein the style of RIC control service is one of a plurality of styles including: a radio bearer control, a radio resource allocation, a connected mode mobility, a radio access control, a dual connectivity, a carrier aggregation, or an idle mode mobility control.

In some embodiment, in case that the style of RIC control service is the radio bearer control: wherein the RAN parameter ID of the information of the RIC control outcome indicates a DRB (data radio bearer), and wherein the RAN parameter value of the information of the RIC control outcome includes a value of the DRB ID.

In some embodiment, the method further comprising: transmitting, to the near-RT RIC, a E2 setup request message including information on a RAN function definition specific to a service model, and receiving, from the near-RT RIC, a E2 setup response message, wherein the information on the RAN function definition includes a control action ID, a control action name, and a sequence of associated RAN parameters for a control action.

In some embodiment, wherein the information on the RIC control outcome includes information on a failure cause in case that an RIC control request is failed.

According to an example embodiment of the disclosure, an apparatus of a near-RT (real time) RIC (radio access network (RAN) intelligent controller (RIC)), comprising: at least one transceiver; and at least one processor coupled to the at least one transceiver, wherein the at least one processor is configured to: transmit, to a E2 node, an RIC control request message including information on a control action identity (ID), and receive, from the E2 node, an RIC control acknowledge message or an RIC control failure message in response to the RIC control request message, wherein the RIC control acknowledge message or the RIC control failure message includes information on an RIC control outcome, wherein the information on the RIC control outcome includes at least one set of RAN parameter, wherein each of the at least one set of RAN parameter includes a RAN parameter ID and a RAN parameter value.

In some embodiment, wherein the RIC control request message includes information on a style of RIC control service, wherein the style of RIC control service is one of a plurality of styles including: a radio bearer control, a radio resource allocation, a connected mode mobility, a radio access control, a dual connectivity, a carrier aggregation, or an idle mode mobility control.

In some embodiment, in case that the style of RIC control service is the radio bearer control: wherein the RAN parameter ID of the information of the RIC control outcome indicates a DRB (data radio bearer), and wherein the RAN parameter value of the information of the RIC control outcome includes a value of the DRB ID.

In some embodiment, wherein the at least one processor is further configured to: receive, from the E2 node, a E2 setup request message including information on a RAN function definition specific to a service model, and transmit, to the E2 node, a E2 setup response message, wherein the information on the RAN function definition includes a control action ID, a control action name, and a sequence of associated RAN parameters for a control action.

In some embodiment, wherein the information on the RIC control outcome includes information on a failure cause in case that an RIC control request is failed.

According to an example embodiment of the disclosure, an apparatus of a E2 node, comprising: at least one transceiver; and at least one processor coupled to the at least one transceiver, wherein the at least one processor is configured to: receive, from a near-RT (real time) RIC (radio access network (RAN) intelligent controller (RIC)), an RIC control request message including information on a control action identity (ID), and transmit, to the near-RT RIC, an RIC control acknowledge message or an RIC control failure message in response to the RIC control request message, wherein the RIC control acknowledge message or the RIC control failure message includes information on an RIC control outcome, wherein the information on the RIC control outcome includes at least one set of RAN parameter, wherein each of the at least one set of RAN parameter includes a RAN parameter ID and a RAN parameter value.

In some embodiment, wherein the RIC control request message includes information on a style of RIC control service, wherein the style of RIC control service is one of a plurality of styles including: a radio bearer control, a radio resource allocation, a connected mode mobility, a radio access control, a dual connectivity, a carrier aggregation, or an idle mode mobility control.

In some embodiment, in case that the style of RIC control service is the radio bearer control: wherein the RAN parameter ID of the information of the RIC control outcome indicates a DRB (data radio bearer), and wherein the RAN parameter value of the information of the RIC control outcome includes a value of the DRB ID.

In some embodiment, wherein the at least one processor is further configured to: transmit, to the near-RT RIC, a E2 setup request message including information on a RAN function definition specific to a service model, and receive, from the near-RT RIC, a E2 setup response message, wherein the information on the RAN function definition includes a control action ID, a control action name, and a sequence of associated RAN parameters for a control action.

In some embodiment, wherein the information on the RIC control outcome includes information on a failure cause in case that an RIC control request is failed.

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. A plurality of memories may be included.

Also, the program may be stored in an attachable storage device accessible via a communication network such as internet, intranet, local area network (LAN), wide LAN (WLAN), or storage area network (SAN), or a communication network by combining these networks. Such a storage device may access a device which executes an embodiment of the disclosure through an external port. In addition, a separate storage device on the communication network may access the device which executes an embodiment of the disclosure.

In the specific embodiments of the disclosure, the components included in the disclosure are expressed in a singular or plural form. However, the singular or plural expression is appropriately selected according to a proposed situation for the convenience of explanation, the disclosure is not limited to a single component or a plurality of components, the components expressed in the plural form may be configured as a single component, and the components expressed in the singular form may be configured as a plurality of components.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a near-real time (RT) radio access network (RAN) intelligent controller (RIC), the method comprising:
    transmitting, to a E2 node, an RIC control request message including information on a control action identity (ID), and information on a style of RIC control service among a plurality of styles; and
    receiving, from the E2 node, an RIC control acknowledge message or an RIC control failure message in response to the RIC control request message,
    wherein the RIC control acknowledge message or the RIC control failure message includes information on an RIC control outcome,
    wherein the information on the RIC control outcome includes at least one set of RAN parameter, and
    wherein each of the at least one set of RAN parameter includes a RAN parameter ID and a RAN parameter value.

2. The method of claim 1,
    wherein the style of RIC control service is one of the plurality of styles including:
    a radio bearer control,
    a radio resource allocation,
    a connected mode mobility,
    a radio access control,
    a dual connectivity,
    a carrier aggregation, or
    an idle mode mobility control.

3. The method of claim 1, in case that the style of RIC control service is radio bearer control,
    wherein the RAN parameter ID of the information on the RIC control outcome indicates a data radio bearer (DRB), and
    wherein the RAN parameter value of the information on the RIC control outcome includes a value for an ID of the DRB.

4. The method of claim 1, the method further comprising:
    receiving, from the E2 node, a E2 setup request message including information on a RAN function definition specific to a service model; and
    transmitting, to the E2 node, a E2 setup response message, wherein the information on the RAN function definition includes a control action ID, a control action name, and a sequence of associated RAN parameters for a control action.

5. The method of claim 1, wherein the information on the RIC control outcome includes information on a failure cause in case that an RIC control request is failed.

6. A method performed by a E2 node, the method comprising:
    receiving, from a near-real time (RT) radio access network (RAN) intelligent controller (RIC), an RIC control request message including information on a control action identity (ID) and information on a style of RIC control service among a plurality of styles; and
    transmitting, to the near-RT RIC, an RIC control acknowledge message or an RIC control failure message in response to the RIC control request message,
    wherein the RIC control acknowledge message or the RIC control failure message includes information on an RIC control outcome,
    wherein the information on the RIC control outcome includes at least one set of RAN parameter, and
    wherein each of the at least one set of RAN parameter includes a RAN parameter ID and a RAN parameter value.

7. The method of claim 6,
    wherein the style of RIC control service is one of the plurality of styles including:
    a radio bearer control,
    a radio resource allocation,
    a connected mode mobility,
    a radio access control,
    a dual connectivity,
    a carrier aggregation, or
    an idle mode mobility control.

8. The method of claim 6, in case that the style of RIC control service is radio bearer control,
    wherein the RAN parameter ID of the information of the RIC control outcome indicates a data radio bearer (DRB), and
    wherein the RAN parameter value of the information of the RIC control outcome includes a value for an ID of the DRB.

9. The method of claim 6, the method further comprising:
    transmitting, to the near-RT RIC, a E2 setup request message including information on a RAN function definition specific to a service model; and
    receiving, from the near-RT RIC, a E2 setup response message,
    wherein the information on the RAN function definition includes a control action ID, a control action name, and a sequence of associated RAN parameters for a control action.

10. The method of claim 6, wherein the information on the RIC control outcome includes information on a failure cause in case that an RIC control request is failed.

11. A near-real time (RT) radio access network (RAN) intelligent controller (RIC) comprising:
    a transceiver; and
    a controller coupled to the transceiver, and configured to:
        transmit, to a E2 node, an RIC control request message including information on a control action identity (ID) and information on a style of RIC control service among a plurality of styles, and
        receive, from the E2 node, an RIC control acknowledge message or an RIC control failure message in response to the RIC control request message, wherein the RIC control acknowledge message or the RIC control failure message includes information on an RIC control outcome, wherein the information on the RIC control outcome includes at least one set of RAN parameter, and wherein each of the at least one set of RAN parameter includes a RAN parameter ID and a RAN parameter value.

12. The near-RT RIC of claim 11, wherein the style of RIC control service is one of the plurality of styles including:

a radio bearer control, a radio resource allocation, a connected mode mobility, a radio access control, a dual connectivity, a carrier aggregation, or an idle mode mobility control.

13. The near-RT RIC of claim 11, in case that the style of RIC control service is radio bearer control, wherein the RAN parameter ID of the information of the RIC control outcome indicates a data radio bearer (DRB), and wherein the RAN parameter value of the information of the RIC control outcome includes a value for an ID of the DRB.

14. The near-RT RIC of claim 11, wherein the controller is further configured to:

receive, from the E2 node, a E2 setup request message including information on a RAN function definition specific to a service model, and transmit, to the E2 node, a E2 setup response message, and wherein the information on the RAN function definition includes a control action ID, a control action name, and a sequence of associated RAN parameters for a control action.

15. The near-RT RIC of claim 11, wherein the information on the RIC control outcome includes information on a failure cause in case that an RIC control request is failed.

16. An E2 node comprising:

a transceiver; and a controller coupled to the transceiver, and configured to:

receive, from a near-real time (RT) radio access network (RAN) intelligent controller (RIC), an RIC control request message including information on a control action identity (ID) and information on a style of RIC control service among a plurality of styles, and transmit, to the near-RT RIC, an RIC control acknowledge message or an RIC control failure message in response to the RIC control request message, wherein the RIC control acknowledge message or the RIC control failure message includes information on an RIC control outcome, wherein the information on the RIC control outcome includes at least one set of RAN parameter, and wherein each of the at least one set of RAN parameter includes a RAN parameter ID and a RAN parameter value.

17. The E2 node of claim 16, wherein the style of RIC control service is one of the plurality of styles including:

a radio bearer control, a radio resource allocation, a connected mode mobility, a radio access control, a dual connectivity, a carrier aggregation, or an idle mode mobility control.

18. The E2 node of claim 16, in case that the style of RIC control service is radio bearer control, wherein the RAN parameter ID of the information of the RIC control outcome indicates a data radio bearer (DRB), and wherein the RAN parameter value of the information of the RIC control outcome includes a value for an ID of the DRB.

19. The E2 node of claim 16, wherein the controller is further configured to:

transmit, to the near-RT RIC, a E2 setup request message including information on a RAN function definition specific to a service model, and receive, from the near-RT RIC, a E2 setup response message, and wherein the information on the RAN function definition includes a control action ID, a control action name, and a sequence of associated RAN parameters for a control action.

20. The E2 node of claim 16, wherein the information on the RIC control outcome includes information on a failure cause in case that an RIC control request is failed.

* * * * *